(12) United States Patent
Yoshino

(10) Patent No.: US 7,259,879 B2
(45) Date of Patent: Aug. 21, 2007

(54) PRINT ORDERING SYSTEM AND CONTROL METHOD THEREFOR, AND SERVER COMPUTER AND COMMUNICATION TERMINAL USED FOR PRINT ORDERING SYSTEM AND CONTROL METHOD THEREFOR

(75) Inventor: Tatsuo Yoshino, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 802 days.

(21) Appl. No.: 09/917,728

(22) Filed: Jul. 31, 2001

(65) Prior Publication Data
US 2002/0057452 A1    May 16, 2002

(30) Foreign Application Priority Data
Jul. 31, 2000   (JP)   ............. 2000-230139

(51) Int. Cl.
G06F 3/12      (2006.01)
G06F 15/00     (2006.01)
G06K 1/00      (2006.01)

(52) U.S. Cl. ............ 358/1.15; 358/1.13; 358/1.14; 358/1.16; 358/1.18; 358/302

(58) Field of Classification Search ........... 358/1.15, 358/1.14, 1.13, 1.16, 1.18, 302
See application file for complete search history.

(56) References Cited

U.S. PATENT DOCUMENTS 5,666,215 A * 9/1997 Fredlund et al. ......... 358/487
6,154,295 A * 11/2000 Fredlund et al. ......... 358/487
6,307,640 B1 * 10/2001 Motegi ................... 358/1.14
6,429,923 B1 * 8/2002 Ueda et al. ............... 355/40
6,657,702 B1 * 12/2003 Chui et al. ................ 355/40
6,771,896 B2 * 8/2004 Tamura et al. ............. 396/57

* cited by examiner

Primary Examiner—Twyler Lamb
Assistant Examiner—Yixing Qin
(74) Attorney, Agent, or Firm—Birch, Stewart, Kolasch & Birch, LLP

(57) ABSTRACT

In order to make it possible to simply order extra prints, an image viewing/ordering ID and an image viewing/ordering password and an order determining ID and an order determining password are issued (created) when input of image data is accepted. Each of members belonging to a group transmits to a server 6 the image viewing/ordering ID and password to a server 6 using a portable telephone set 20A. Image data related to the image viewing/ordering ID is transmitted to the portable telephone set 20A from the server 6. While seeing images displayed on a display screen of the portable telephone set 20A, each of the members belonging to the group selects the image whose extra prints are ordered, and transmits the number of ordered prints of the image to the server 6. When the order determining ID and password are transmitted to the server 6 using the portable telephone set 20A, the order given by the member is made definite, thereby making a desired number of extra prints of the image desired by the members.

12 Claims, 20 Drawing Sheets

*Fig. 3*

GROUP DATA TABLE  /41

| GROUP ID | GROUP REPRESENTATIVE INFORMATION | DB REGISTRATION DATE & TIME | PLANNED DELETION DATE & TIME | VIEWING / ORDERING ID |
|---|---|---|---|---|
| ... | ... | ... | ... | ... |
| 000601-3 | TARO TOKKYO 03-1111-1111/taro@abc.com | 1/6/2000 14:32 | 15/6/2000 18:00 | B-000601-3 |
| 000601-4 | YUKO JITSUYO 03-2222-2222/you@def.jp | 1/6/2000 14:45 | 15/6/2000 18:00 | B-000601-4 |
| 000601-5 | HAZIME ISHO 03-3333-3333/one@ghi.jp | 1/6/2000 15:04 | 15/6/2000 18:00 | B-000601-5 |
| ... | ... | ... | ... | ... |

| VIEWING/ORDERING PASSWORD | ORDER DETERMINING ID | ORDER DETERMINING PASSWORD | IMAGE STOCK HOLDER | ORDER TABLE HOLDER |
|---|---|---|---|---|
| ... | ... | ... | ... | ... |
| axqowiip | K-000601-3 | difjeuvw | ¥IMG¥000601-3 | ¥ORD¥000601-3 |
| bxaivbyc | K-000601-4 | fdijfzuw | ¥IMG¥000601-4 | ¥ORD¥000601-4 |
| crpbpcxb | K-000601-5 | dkhapjmn | ¥IMG¥000601-5 | ¥ORD¥000601-5 |
| ... | ... | ... | ... | ... |

Fig. 4

ORDER TABLE 42

| GROUP ID | ORDER STATUS | ORDER DATE & TIME | PLANNED COMPLETION DATE & TIME | MEMBER NUMBER |
|---|---|---|---|---|
| 000601-3 | ALREADY | 16:32, 01/6/2000 | 14:00, 02/6/2000 | 001 |
| | | | | 002 |
| | | | | 003 |
| | | | | 004 |

| NICKNAME | TYPE OF ORDER | ORDERED IMAGE NUMBER / NUMBER OF ORDERED PRINTS | | | | | | | |
|---|---|---|---|---|---|---|---|---|---|
| | | 001 | 002 | 003 | 004 | ... | 014 | 015 | 016 |
| taro | SIMULTANEOUS PRINTING | 0 | 0 | 1 | 1 | ... | 0 | 0 | 1 |
| jiro | EXTRA PRINTING | 3 | 0 | 0 | 1 | ... | 0 | 1 | 0 |
| sabu | EXTRA PRINTING | 0 | 0 | 0 | 1 | ... | 2 | 0 | 0 |
| hanako | EXTRA PRINTING | 0 | 1 | 0 | 2 | ... | 0 | 1 | 1 |

IMAGE REGISTRATION PROCESSING

*Fig. 17*

"ABC SHOP EXTRA PRINTS ORDER SERVICE"
THANK YOU.

CHANGE CONTENTS OF ORDER
BEFORE GROUP ORDER.

"ABC SHOP EXTRA PRINTS ORDER SERVICE"
CONFIRM ORDER CONDITION.

W8a →

▲
Push
▼

1. hanako : 8    ← W8b
2. taro    : 5
3. jiro    : 10
4. sabu    : 3
         :

TOTAL : 26    ← W8c       SUM : 1,300 YEN    ← W8d

| TOP | | ORDER |

"ABC SHOP EXTRA PRINTS ORDER SERVICE"
THANK YOU FOR ORDER.

16 : 32, June 1, 2000
ORDER DETERMINING ID : K-000601-3
NUMBER OF ORDERED PRINTS : 26
SUM : 1,300 YEN
PLANNED COMPLETION DATE & TIME
14 : 00, June 2, 2000

STOCK IMAGES WILL BE KEPT
UNTIL 18:00, JUNE 15, 2000.
ORDER EXTRA PRINTS BY THAT TIME.

GROUP ID : 000601-3
< No. 001 >
MEMBER No. 002/jiro

PRINT ORDERING SYSTEM AND CONTROL METHOD THEREFOR, AND SERVER COMPUTER AND COMMUNICATION TERMINAL USED FOR PRINT ORDERING SYSTEM AND CONTROL METHOD THEREFOR

BACKGROUND OF THE INVENTION

1. Field of the Invention

The present invention relates to a print ordering system and a control method therefor, and a server computer and a communication terminal used for the print ordering system and a control method therefor.

2. Description of the Background Art

In a DPE (Develop, Print & Enlarge) agent, an undeveloped film is deposited from a customer, and is developed (the DPE agent may, in some cases, request another shop to develop the film). The film is developed, and images recorded on the developed film are printed (simultaneous printing). The developed film and its prints are later returned to the customer.

Some customer may, in some cases, take the developed film to the DPE agent again in order to request to make extra prints (extra printing). The customer informs a clerk employed in the DPE agent which of the images (frames) recorded on the developed film should be printed extra and how many extra prints of the image should be made. It is necessary to previously put together images whose extra prints are desired to be made and the respective numbers of extra prints of the images. In any case, the customer must visit the DEP agent at least twice when the extra prints are made.

SUMMARY OF THE INVENTION

An object of the present invention is to make it possible to simply order prints and particularly, extra prints without visiting a DEP agent a plurality of times.

Another object of the present invention is to make it easy to put together orders in a group comprising a plurality of members.

Still another object of the present invention is to make it possible to simply classify prints by information respectively printed on the reverse surfaces of the prints.

A further object of the present invention is to provide a device for processing an undeveloped film.

A print ordering system according to the present invention is a system constructed by connecting a server computer having an image database storing image data and a communication terminal such that they can communicate with each other through a network.

The server computer comprises image data transmission means (device) for transmitting the image data stored in the image database to the communication terminal in response to an image transmission request from the communication terminal. The communication terminal used for the image transmission request includes a variety of devices such as a portable telephone set, an electronic notebook, and a personal computer.

The communication terminal has a display device for displaying an image represented by the image data transmitted from the server computer, and order information transmission means (device) for transmitting to the server computer order information related to prints of the image displayed on the display device.

The server computer further comprises a storage device for storing the order information transmitted from the communication terminal.

The communication terminal further comprises print command transmission means (device) for transmitting a print command to the server computer.

The server computer further comprises means for (a controller) controlling a printer so as to print the image represented by the image data specified on the basis of the order information stored in the storage device in response to the receiving of the print command.

The present invention also provides a method of controlling the above-mentioned system. That is, the present invention provides a method of controlling a print ordering system in which a server computer having an image database storing image data and a communication terminal can be connected such that they can communicate with each other through a network.

In the system controlling method, the server computer transmits the image data stored in the image database to the communication terminal in response to an image transmission request from the communication terminal. On the communication terminal, an image represented by the image data transmitted from the server computer is displayed. Order information related to prints of the displayed image is transmitted to the server computer from the communication terminal. The server computer stores the order information transmitted from the communication terminal.

Furthermore, a print command is transmitted to the server computer from the communication terminal. The server computer controls a printer so as to print the image represented by the image data specified on the basis of the order information stored in the storage device in response to the receiving of the print command.

According to the present invention, the image data is stored in the image database in the server computer. When the communication terminal transmits the image transmission request to the server computer, the image data stored in the image database is transmitted (downloaded) to the communication terminal. The communication terminal has the display device. Accordingly, a user of the communication terminal can see (view) the downloaded images. The image whose extra prints are desired to be made can be selected on the display screen. The image (frame) whose extra prints are desired to be made need not be necessarily selected depending on the image printed on printing paper or the like. The server computer and the communication terminal are connected to each other through the network. Accordingly, the extra prints can be ordered without visiting the place where the server computer having the image database storing the image data is installed (for example, a DEP agent).

Furthermore, according to the present invention, the order information related to prints is stored once in the storage device in the server. The printer is subjected to print control in response to the print command transmitted to the server computer from the communication terminal thereafter on the basis of the order information stored in the storage device. The print command is what is called one for making the order information definite. The control of the printer (control for printing the image) is waited for until the print command is transmitted. The transition to printing processing does not occur until the print command is issued. For example, extra prints (prints of the image represented by the image data stored in the image database) are ordered from each of a plurality of members belonging to a group. The order information is stored in the storage device in the server computer. When one of the members (for example, a representative) transmits the print command to the server computer, the printer is controlled in accordance with the order information stored in the storage device, so that the image is printed. That is, the member transmits the order information to the server computer in a time period elapsed until the print command is transmitted. Before the print command is issued, the contents of the order information can be also changed.

Preferably, the order information includes information for specifying the image as well as desired number-of-prints information representing the desired number of prints of the specified image. When image data representing a plurality of images is stored in the image database, it is indicated which of the images should be printed or how many extra prints of the image should be made.

In one mode, the server computer further comprises means for calculating a print charge on the basis of the desired number-of-prints information, and print charge transmission means for transmitting to the communication terminal data representing the calculated print charge. The print charge may be transmitted by other methods such as an E-mail and a facsimile. The required print charge can be presented to a user of the communication terminal.

In another mode, the server computer further comprises means for calculating a planned completion date (and time) for prints in response to the print command from the communication terminal, and planned completion date transmission means for transmitting to the communication terminal data representing the calculated planned completion date (and time). The printer is controlled such that the image is printed in accordance with the order information in response to the print command. Accordingly, the planned completion date (and time) for prints can be previously calculated. The planned completion date (and time) may be varied depending on the number of prints, or may be varied depending on the day of the week on which the print command is issued.

In still another mode, the server computer further comprises order condition information transmission means for transmitting to the communication terminal order condition information represented on the basis of the order information stored in the storage device in response to an order condition confirmation request from the communication terminal. The contents of the order represented by the order information can be confirmed before being determined (printed by the printer) by the print command.

In the transmission of the image data responsive to the image transmission request from the communication terminal, the image data may be successively transmitted in response to the image transmission request the image corresponding to one frame at a time, or image data corresponding to a plurality of frames may be transmitted by issuing the image transmission request once. From the image data stored in the image database, image data having a smaller data capacity (for example, a thumbnail image) may be generated, to transmit to the communication terminal the generated image data having a small data capacity. Preferably, the server computer further comprises means for accepting from the communication terminal the transmission of display device type information related to the type of the display device provided in the communication terminal. The image data transmission means (device) converts the image data stored in the image database into image data adaptable to the display device in the communication terminal in accordance with the display device type information and transmits the image data to the communication terminal. On the display device in the communication terminal used for seeing (viewing) the image, the image adaptable to the type of the display device can be displayed. The terminal type information may be information related to the type of the communication terminal (a portable telephone set, a personal computer, etc.), information related to the type (black-and-white or color) of the display device itself (a display) or the display capability of the display device, or the like. For example, it is also possible to choose that the image data is transmitted one frame at a time if the communication terminal having a small display screen is used, while being transmitted a plurality of frames at a time if the communication terminal having a large display screen is used.

Preferably, the server computer further comprises image data registration acceptance means for accepting the registration of the image data stored in the image database, and first ID generation means for generating an image ordering ID and a print commanding ID in correlation with the accepted image data in response to the acceptance of the image data by the image data registration acceptance means. The image transmission request transmitted from the communication terminal shall include the image ordering ID. The image data transmission means (device) transmits to the communication terminal the image data correlated with the image ordering ID in response to the image transmission request from the communication terminal. The print command transmitted from the communication terminal shall include the print commanding ID. The printer control means (controller) controls the printer so as to print an image represented by the image data correlated with the print commanding ID in response to the print command from the communication terminal.

The acceptance of the image data includes the acceptance (receiving) of image data by communication through a network in addition to the acceptance from an undeveloped film, a developed film, or a recording medium such as a memory card or a CD-R (CD-Recordable). The image recorded on the film is subjected to image reading processing using a scanner (an image reader) in advance. Image data obtained by the image reading processing is stored in the image database.

In accepting the image data, one film or one recording medium (a memory card, a CD-R, etc.) may be taken as a unit of acceptance, or a plurality of films (negatives) which have been developed may be taken as a unit of acceptance. Generally, the image data representing the plurality of images is recorded or stored in one film or one recording medium. Accordingly, the image ordering ID and the print commanding ID which are generated by the first ID generation means are correlated with a plurality of image data (a plurality of groups of image data).

Even when the image data representing a lot of images is stored in the image database, by correlating the image ordering ID and the print commanding ID with the groups of image data, the particular group of image data can be transmitted to the communication terminal on the basis of the image ordering ID, and the print command can be issued with respect to the particular group of image data on the basis of the print commanding ID. Since the image ordering ID and the print commanding ID are generated in response to the acceptance of the image data, the groups of image data respectively specified by the image ordering ID and the print commanding ID are correlated with each other (images in a group comprising several members, for example).

For example, a common identification code is included in respective parts of the image ordering ID and the print commanding ID. Image data in one unit of acceptance (a group of image data) is correlated with one holder in the image database. The common identification code is also included in a part of the holder name of the holder. Consequently, the image ordering ID and the print commanding ID are correlated with the groups of image data.

By thus including the image ordering ID in the image transmission request transmitted to the server computer from the communication terminal, the user of the communication terminal can view (see) the images represented by the image data correlated with the image ordering ID out of the image data stored in the image database. The user of the communication terminal selects the image whose prints are ordered out of the read images, and determines the number of prints (the number of extra prints) of the image. The print commanding ID is included in the print command, thereby making it possible to judge which of the images represented by the image data in the image database should be printed. Of course, the user of the communication terminal is previously informed of the image ordering ID and the print commanding ID. For example, if each of a plurality of members belonging to a group is previously informed of the image ordering ID, the images of the group to which the member belongs can be displayed on a display device in a communication terminal on the side of the member. All the members belonging to the group need not be necessarily informed of the print commanding ID. If any one of the members is informed of the print commanding ID, the member transmits the print command to the server computer, thereby controlling the printer such that the images are printed on the basis of order information related to all the members.

The server computer may further comprise password generation means for respectively generating an image ordering password corresponding to the image ordering ID and a print commanding password corresponding to the print commanding ID which are generated by the first ID generation means, image data transmission judgment means for judging whether or not the image data should be transmitted to the communication terminal on the basis of the image ordering ID and the image ordering password, and print judgment means for judging whether or not the printer should be controlled so as to print the image represented by the image data on the basis of the print commanding ID and the print commanding password. The image transmission request transmitted from the communication terminal shall further include the image ordering password. The image data transmission means (device) transmits the image data to the communication terminal when it is judged that the image data can be transmitted by the image data transmission judgment means on the basis of the image ordering ID and the image ordering password. The print command transmitted from the communication terminal shall further comprise the print commanding password. The printer control means controls the printer so as to print the image represented by the image data in a case where it is judged that printing is possible by the print judgment means on the basis of the print commanding ID and the print commanding password. The image ordering password and the print commanding password can be utilized for so-called authentication processing. It is possible to limit access to the server computer (image reading) by a person other than a person who has been previously informed of the image ordering ID and the image ordering password. It is possible to limit the print command issued by a person other than a person who has been previously informed of the print commanding ID and the print commanding password.

The server computer may further comprise second ID generation means for generating a member specifying ID in correlation with the image ordering ID generated by the first ID generation means. The storage device may store the order information transmitted from the communication terminal and the member specifying ID with both correlated with each other. If the member specifying ID, together with the order information, is transmitted from the communication terminal, it is possible to specify, when a group comprises a plurality of members, which of the members orders prints.

In a preferred mode, the server computer further comprises means for erasing from the image database the image data stored in the image database when a predetermined set time period has elapsed from a date for acceptance of the image data by the image data registration acceptance means. When a predetermined time period (the number of days) has elapsed since the image data was stored (registered), the image data is erased from the image database, thereby making it possible to make effective use of the image database.

The server computer may further comprise erasure confirmation transmission means for transmitting data representing a planned erasure date to the communication terminal prior to erasing the image data by the erasure means. The erasure means may extend the set time period for the image data specified on the basis of the order information stored in the storage device in response to the print command from the communication terminal.

The present invention also provides a server computer and a communication terminal which constitute the print ordering system and a method of controlling the same.

Furthermore, the present invention provides a printing device with respect to an undeveloped film.

The printing device according to the present invention comprises means for (a developer) developing an undeveloped film; printing means for (a printer) printing an image represented by image information recorded on a developed film; and means for (an image reader) reading the image information recorded on the developed film and storing the read image information in a database.

The undeveloped film, which has been photographed, taken into a DPE agent, for example, is developed and printed by the printing device, and image information representing the image is stored in the database. The image information stored in the database can be transmitted through the network or the like, or can be utilized in the above-mentioned print ordering system.

Furthermore, the present invention provides a printing device for effectively utilizing the reverse surface of a print on which an image has been printed.

The printing device according to the present invention comprises a first storage device storing image data and print order information acceptance means for accepting information related to a print order, and prints, on the basis of the print order information, an image represented by the image data stored in the first storage device.

The printing device further comprises a second storage device for storing for each print order member specifying information for specifying a member who has given the print order, group specifying information for specifying a group to which the member belongs, and image specifying information for specifying an image whose prints have been ordered with the information correlated with each other, image printing means for (an image printer) printing on the surface of printing paper the image, represented by the image data stored in the first storage device, which is specified by the image specifying information stored in the second storage device, and information printing means for (an information printer) printing on the reverse surface of the printing paper the member specifying information, the group specifying information, and the image specifying information which are stored in the second storage device in correspondence with the image displayed on the surface of the printing paper.

When the prints are handed to the members belonging to the group, information (member information, group specifying information, and image specifying information) printed on the respective reverse surfaces of the prints (printing paper) can be utilized. Work such as classification as to which of the groups should be selected, which of the members belonging to the selected group should be selected, and which image should be handed to the member.

The foregoing and other objects, features, aspects and advantages of the present invention will become more apparent from the following detailed description of the present invention when considered in conjunction with the accompanying drawings.

BRIEF DESCRIPTION OF THE DRAWINGS

FIG. 3 is an example of a group data table.

FIG. 4 illustrates an example of an order table;

FIG. 17 illustrates a viewing/ordering processing termination page;

FIG. 20 illustrates an order condition confirmation page;

FIG. 21 illustrates a group order determination page;

FIG. 26 illustrates an example of the reverse surface of a print.

DESCRIPTION OF THE PREFERRED EMBODIMENTS (1) Configuration of Print Ordering System FIG. 1 is a conceptual diagram showing the overall configuration of a print ordering system.

Figure 1:
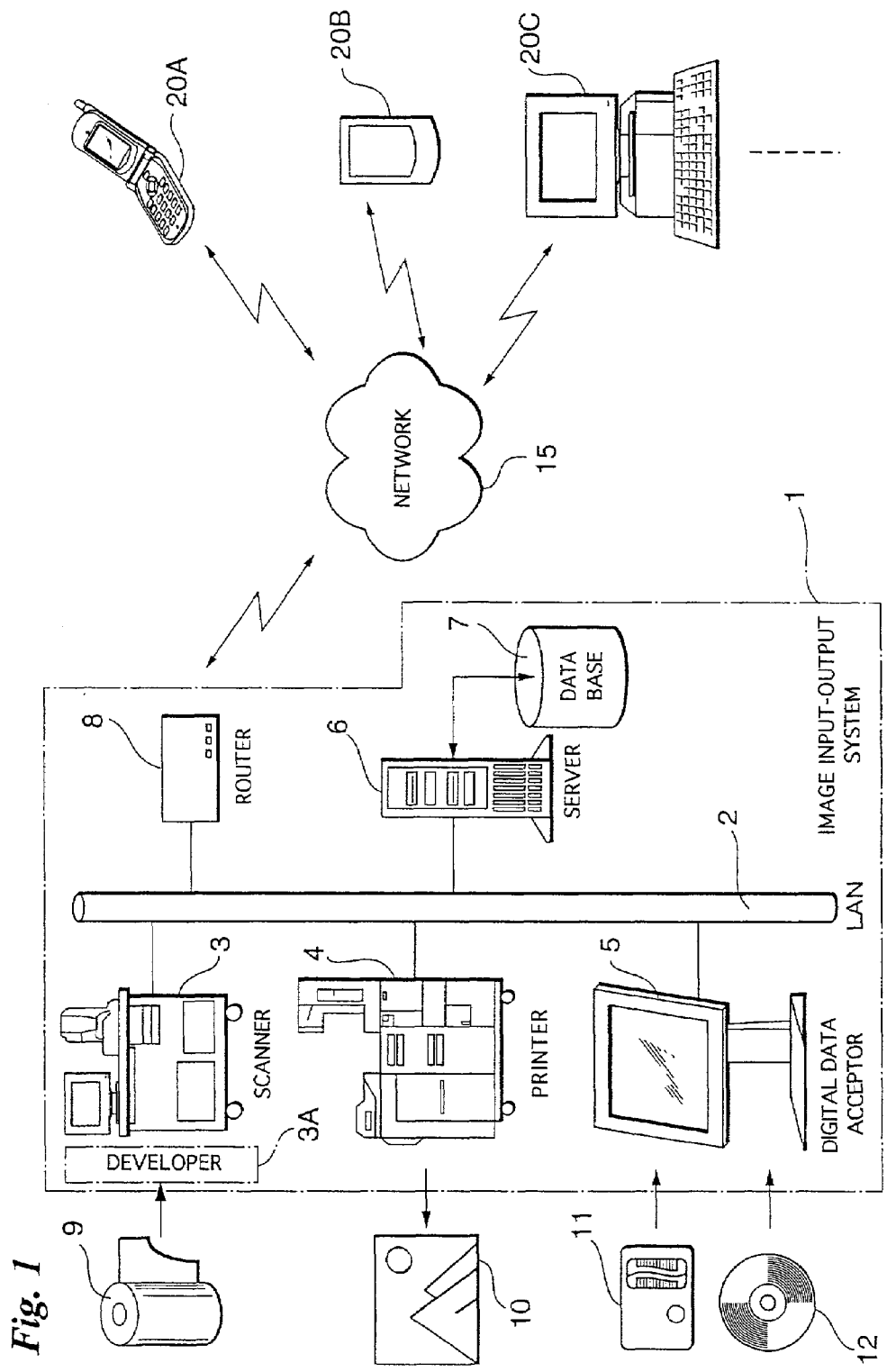
FIG. 1 is a diagram showing the overall configuration of a print ordering system.

The print ordering system comprises an image input-output system 1 and a variety of information communication terminals (terminal units) (a portable telephone set 20A, a portable information communication terminal (an electronic notebook, etc.) 20B, a personal computer 20C, etc.) which can be connected to each other through a network 15 (including either one of a public line and a dedicated line, for example, the Internet and an intranet). The image input-output system 1 is installed in a DPE agent (shop), for example. A user who requests to print a photograph (which may, in some cases, involve development) using the print ordering system shall have the variety of information communication terminals in the present embodiment.

The image input-output system 1 comprises a scanner 3, a printer 4, a digital data acceptor 5, a server 6, and a router 8. All of them are connected to a LAN (Local Area Network) 2, and can transmit and receive data (inclusive of image data) to and from each other.

The scanner 3 performs processing for scanning an image recorded on a film 9 and changing the image into digital image data (digitization). If the film 9 has not been developed yet, the film 9 is previously developed in a developer 3A.

The printer 4 prints on photographic printing paper an image represented by the digital image data fed from the scanner 3 or the server 6 and outputs the printed image (outputs a print 10).

The digital data acceptor 5 is for reading digital image data recorded on a recording medium such as the memory card 11 or a CD (Compact Disk) 12 (which includes a write-once one). The digital data acceptor S comprises a drive (a memory card drive, a CD drive, etc.) for reading out the digital image data recorded on the memory card 11 or the CD 12.

The server 6 forms the backbone of the print ordering system, and provides the image represented by the digital image data so as to be readable (so that capable of being displayed or viewed) under predetermined conditions for the variety of information communication terminals (the portable telephone set 20A, the portable information terminal 20B, the personal computer 20C, etc.) which have accessed the server 6 through the network 15, as described later. A database 7 is connected to the server 6, and the digital image data stored in the database 7 is transmitted to the variety of information communication terminals through the network 15. The details of processing performed by the server 6 in the print ordering system will be described later.

The router 8 controls the transmission and receiving of the data between the server 6 and the variety of information communication terminals.

The manner of the typical operation of the print ordering system is as follows.

One (a representative) of a plurality of members belonging to a group takes the film 9 into a shop. In the shop, images recorded on the film 9 are read and stored as digital image data in the database 7 by an operation of a clerk employed in the shop. Each of the members belonging to the group accesses the server 6 in the image input-output system 1 using the information communication terminal such as the portable telephone set 20A, to order prints. Finally, the representative of the group definitely decides the print order of each the member (order determination). By the order determination, processing for printing the image or images conforming to the contents of the print order by the member is performed in the shop. The representative of the group receives the prints in the shop, and distributes the received prints among the members.

In such a print ordering system, the following three processing is basically performed.

① Image Registration Processing

This processing is for digitizing the images recorded on the film 9 which a user of the print ordering system (the representative) takes into the shop and registering the digital image data into the database 7. When the user takes a medium on which the digital image data has been recorded, for example, a memory card into the shop, it goes without saying that the digitization processing is omitted. The digital image data may be transmitted to the shop (the image input-output system 1) through the network 15. As described later, in the image registration processing, an ID is issued, or a password is issued (generated), for example. The details of the image registration processing will be described later.

② Viewing/Ordering Processing

This processing is for accepting a print order by the user utilizing the information communication terminal. While seeing images displayed on a display screen of the portable telephone set 20A, for example (images stored in the database 7 in the server 6) (viewing), the user selects the image to be ordered and determines the order number of prints of the image (ordering). In viewing and ordering the image, the ID and the password which have been issued in the image registration processing (a viewing/ordering ID and a viewing/ordering password) are used. The details of the viewing/ordering processing will be described later.

③ Order Determination Processing

This processing is for definitely deciding (determining) the print order utilizing the information communication terminal. In the order determination processing, an ID and a password (an order determining ID and an order determining password) which respectively differ from the viewing/ordering ID and the viewing/ordering password which are used in the viewing/ordering processing are used. The details of the order determination processing will be described later.

(2) Database

Figure 2:
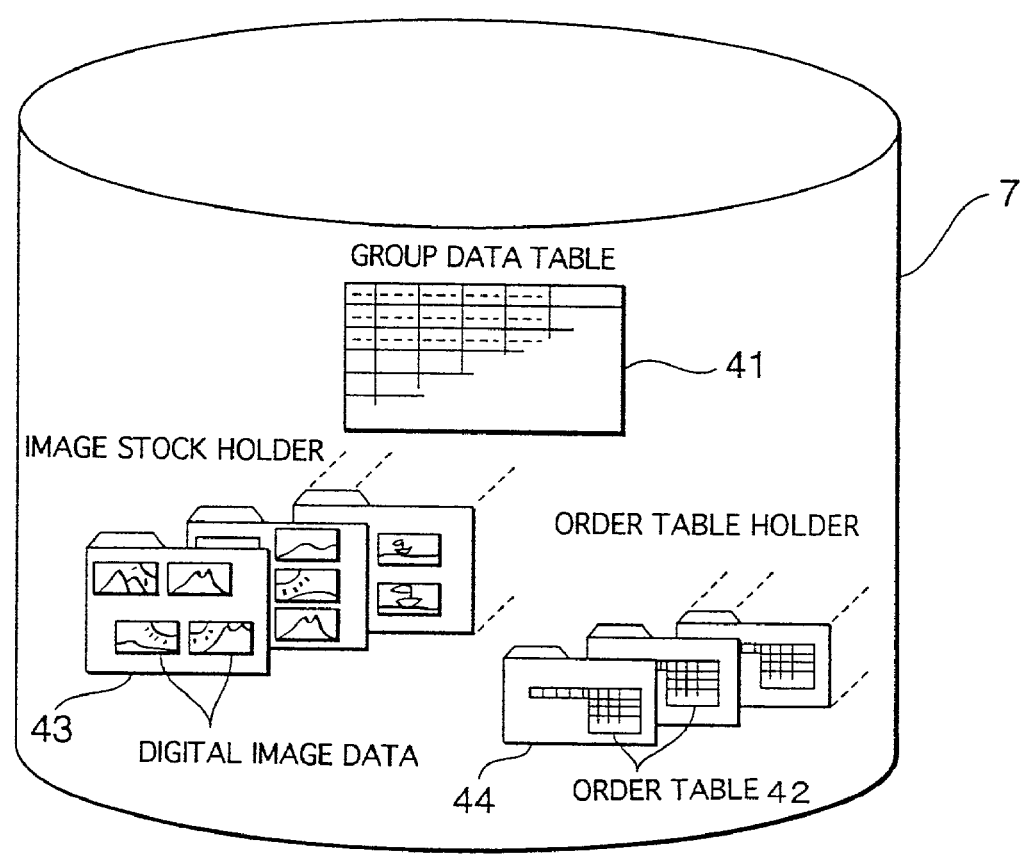
FIG. 2 is a diagram showing the contents of a database.

FIG. 2 schematically illustrates the contents of the database 7.

The database 7 stores a group data table 41, an image stock holder 43, and an order table holder 44. Further, digital image data is registered (stored) so as to belong to the image stock holder 43. An order table 42 is registered so as to belong to the order table holder 44.

FIG. 3 illustrates an example of the group data table 41.

The group data table 41 (FIG. 3) includes items "Group ID", "Group representative information", "Database (DB) registration date & time", "Planned deletion date & time", "Viewing/ordering ID", "Viewing/ordering password", "Order determining ID", "Order determining password", "Image stock holder", and "Order table holder".

"Group ID" is a code assigned to each of groups each comprising a plurality of members for identifying the group. "Group representative information" stores the name, the telephone number, and the E-mail address of a representative of the group. In the group data table 41, one record is assigned to one group. The image stock holder 42 and the order table holder 43 are assigned to each of the groups.

"DB registration date & time" is a date and time (year, month, day and time) on which digital image data is registered in the database 7. "Planned deletion date & time" is a planned date and time on which the digital image data registered in the database 7 is deleted (erased) from the database 7.

"Viewing/ordering ID" and "Viewing/ordering password" are codes used when each of the members belonging to the group views and orders an image in the group, to which the member himself or herself belongs, previously registered in the database 7 in the server 6 using the portable telephone set 20A, for example, and authorizing him or her.

"Order determining ID" and "Order determining password" are codes used when the representative of the group definitely decides (determines) the order by each of the members belonging to the group and authorizing the representative.

Stored (described) in "Image stock holder" is a pass in the database 7 (or in a storage device provided in the server 6 including the database 7) to a holder (the image stock holder 43) to which the digital image data belongs with respect to each of the groups. Stored (described) in "Order table holder" is a pass to a holder (the order table holder 44) to which the order table 42 belongs with respect to each of the groups. Both of the pass to the image stock holder 43 and the order table holder 44 include the same character string as the above-mentioned group ID.

FIG. 4 illustrates an example of the order table 42.

The order table 42 (an order file) is created for each record (that is, for each group) in the group data table 41.

The order table 42 is provided with items "Group ID", "Order status", "Order date & time", "Planned completion date & time", "Member number", "Nickname", "Type of order", and "Ordered image number/number of ordered prints". Each of the items "Group ID", "Order status", "Order date & time", and "Planned deletion date & time" is provided with respect to one order table (group). The items "Member number", "Nickname", "Type of order", and "Ordered image number/number of ordered prints" are provided with respect to each of the members belonging to the group.

"Order status" indicates whether or not the order has been determined by the representative of the group (whether determination processing of the order executed by each of the members belonging to the group has been performed). Either one of "Yet" and "Already" is stored. "Yet" indicates that the order has not been determined yet, and "Already" indicates that the order has already been determined.

"Order date & time" indicates a date and time on which the order is determined by the representative of the group. "Planned completion date & time" indicates a planned date and time on which prints of the images have been made and can be handed in the shop.

"Member number" is a number assigned to each of the members belonging to the group. "Nickname" is a nickname for each of the members belonging to the group.

"Type of order" is for distinguishing between simultaneous printing (development and printing) and extra printing (only printing). When an undeveloped film is taken into the shop, "Simultaneous printing" is stored with respect to the member who has taken the undeveloped film. "Extra printing" is stored with respect to the other members.

"Order image number/number of ordered prints" stores the image number of the image whose prints are desired to be made by each of the members belonging to the group and the desired number of prints of the image specified by the image number.

Figure 5:
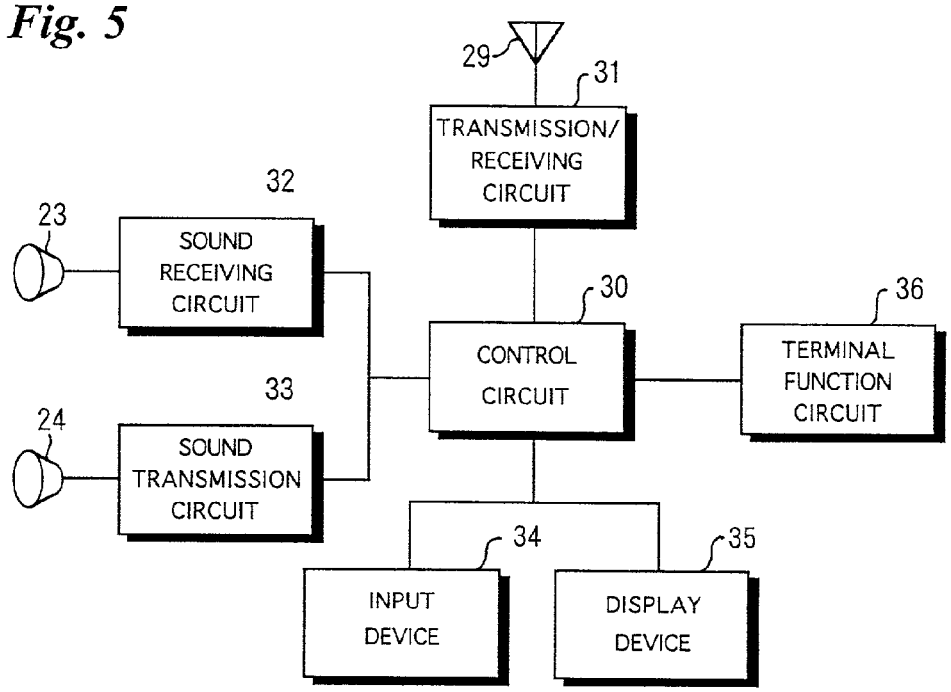
FIG. 5 is a block diagram showing the schematic circuit configuration of a portable telephone set.

Each of the members belonging to the group selects the image whose prints are desired to be made and enters the desired number of prints of the selected image to register them in the database 7 (the order table 42) of the server 6, using the information communication terminal (the portable telephone set 20A, the portable communication terminal 20B, the personal computer 20C, etc.). FIG. 5 shows the schematic electrical configuration of the portable telephone set 20A which is one of the information communication terminals.

The portable telephone set 20A comprises a control circuit 30. The control circuit 30 comprises a central processing unit and its input-output interface. The overall operation of the portable telephone set 20A is supervised by the control circuit 30. A transmission/receiving circuit 31, a sound receiving circuit 32, a sound transmission circuit 33, an input device 34, a display device 35, and a terminal function circuit 36 are connected to the control circuit 30. An antenna 29 is connected to the transmission/receiving circuit 31.

The portable telephone set 20A is basically used for transmitting and receiving voice (sound) to and from another portable telephone set, general telephone equipment, or the like. When the input device 34 is used to enter the telephone number of a portable telephone set or the like on the side of the other party, data representing the inputted telephone number is sent to a base station (an exchange) through the control circuit 30, the transmission/receiving circuit 31, and the antenna 29. When a line is connected to the portable telephone set or the like on the side of the other party, voice is transmitted and received between the portable telephone set 20A and the portable telephone set or the like on the side of the other party.

Voice data received through the antenna 29 and the transmission/receiving circuit 31 is decoded by the control circuit 30 and the sound receiving circuit 32. When the decoded voice data is fed to a speaker 23, the voice of the other party is heard from the speaker 23. When voice (a word) is given toward the receiver (microphone) 24, the voice is encoded by the sound transmission circuit 33 and the control circuit 30, and is outputted as voice data. The voice data is transmitted to the portable telephone set or the like on the side of the other party through the transmission/receiving circuit 31 and the antenna 29.

The portable telephone set 20A can transmit and receive another data (character data, image data, etc.) besides transmitting and receiving the voice. Therefore, a communication program (for example, a browser) is stored in the terminal function circuit 36 connected to the control circuit 30.

The browser is a communication program used for connecting the portable telephone set 20A to the server 6 (and another server) through the network 15. The use of the browser allows the database 7 in the server 6 in the image input-output system 1 to be accessed from the portable telephone set 20A. Various types of data (character data, image data, etc.) stored in the database 7 are transmitted to the portable telephone set 20A through the network 15, and received by the antenna 29 and the transmission/receiving circuit 31. Characters represented by the character data, images represented by the image data, and so forth can be displayed on the display screen of the display device 35.

Figure 6:
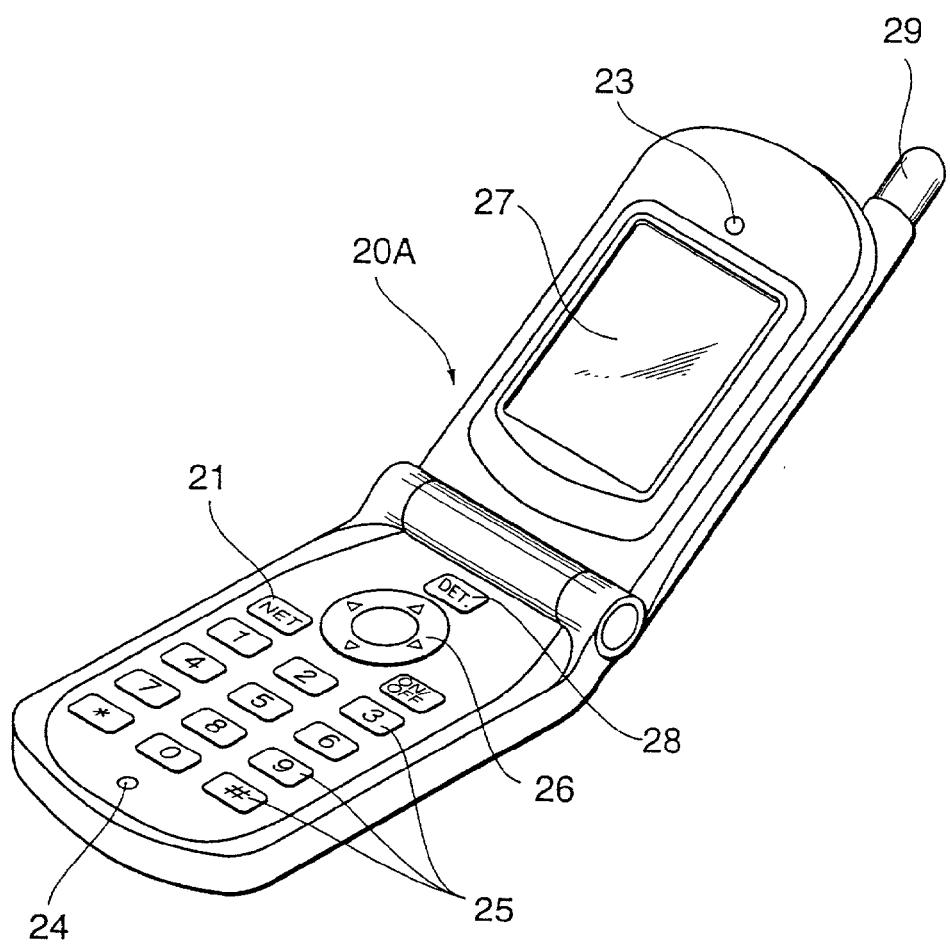
FIG. 6 is a perspective view showing the appearance of the portable telephone set.

An example of the appearance of the portable telephone set 20A having the above-mentioned electrical configuration is illustrated in perspective in FIG. 6.

The upper half of the portable telephone set 20A shown in FIG. 6 is provided with a display device 35 (a display screen 27), a speaker 23, and an antenna 29. Characters and images are displayed on the display screen 27 of the display device 35.

The lower half of the portable telephone set 20A comprises an input device 34 and a receiver 24. The input device 34 comprises various types of keys and buttons such as a ten-key pad 25, an up-down-right-left key 26, a network connection button 21, and a determination button 28. The keys and buttons are used for transmitting and receiving data to and from the server 6.

(3) Operation of Print Ordering System
① Image Registration Processing

Figure 7:
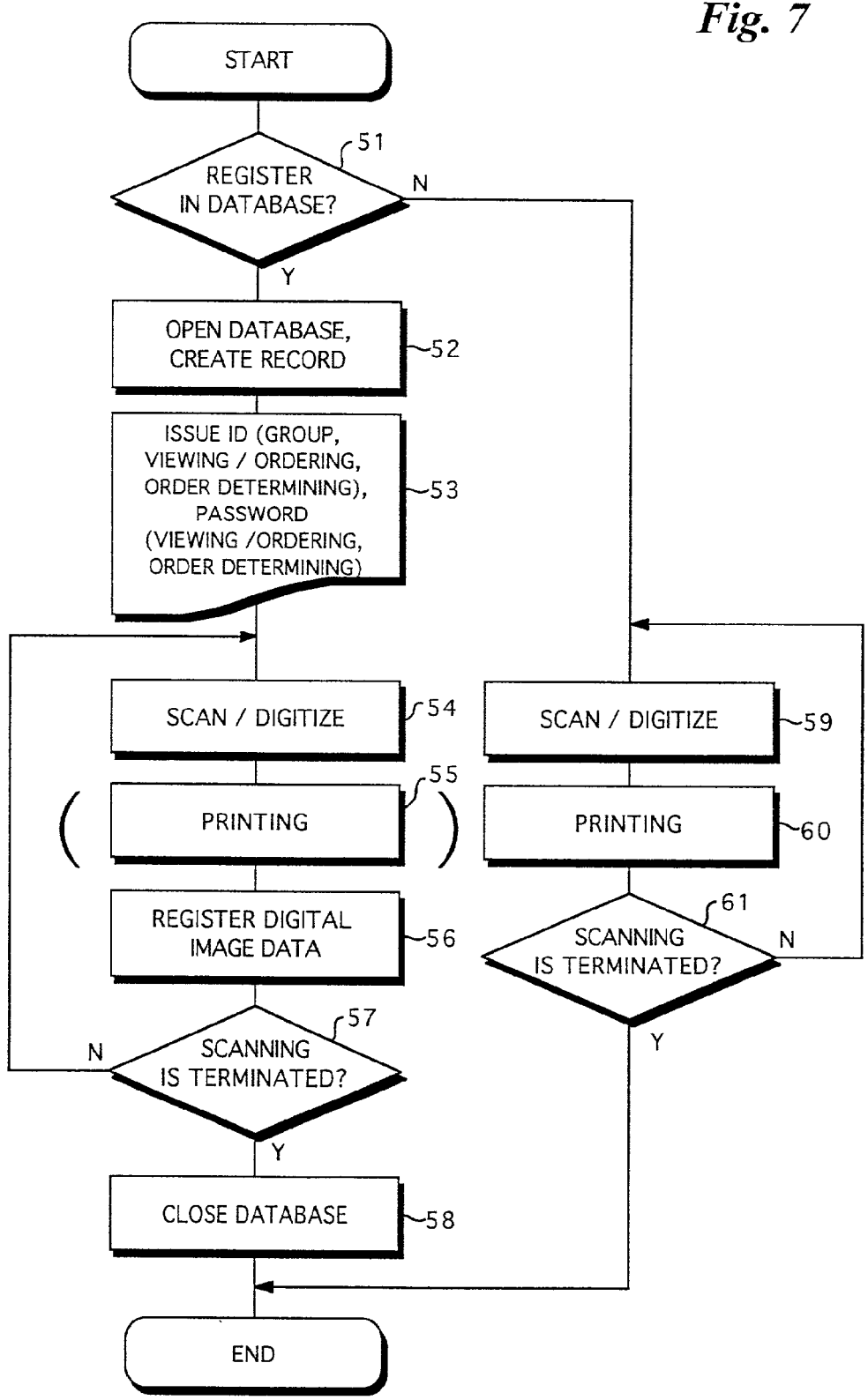
FIG. 7 is a flow chart showing the flow of image registration processing.

FIG. 7 is a flow chart showing the flow of image registration processing which is one processing of the print ordering system.

The film 9 (which shall be a photographed film) is taken into the shop by the representative of the group. When the representative of the group desires to register the digital image data (representing images of the film 9) in the database 7 (YES at step 51), a clerk opens the group data table 41 in the database 7 using the server 6, and creates a new record in the group data table 41 (step 52). The representative of the group informs the clerk of his or her name, telephone number and E-mail address (group representative information). The clerk enters the group representative information into the server 6.

A group ID, a viewing/ordering ID, a viewing/ordering password, an order determining ID, and an order determining password are issued by the server 6 (step 53). The group ID, the viewing/ordering ID, the viewing/ordering password, the order determining ID, and the order determining password which have been issued, and the entered group representative information (the name, the telephone number, and the E-mail address of the representative of the group) are stored in the newly created record in the group data table 41. Further, in the database 7, a new order table 42 including the issued group ID as an item, and an image stock holder 43 and an order table holder 44 are created. The order table 42 is stored in the database 7 so as to belong to the created order table holder 44.

The representative of the group who takes the film 9 is informed of the viewing/ordering ID, the viewing/ordering password, the order determining ID, and the order determining password, and the URL (Uniform Resource Locator; address) of the shop (which may be handed after being printed on paper, or may be reported by an E-mail). The representative of the group informs the other members belonging to the group of the viewing/ordering ID, the viewing/ordering password, and the URL of the shop out of the viewing/ordering ID, the viewing/ordering password, the order determining ID, and the order determining password and the URL of the shop which have been reported. The other members are not generally informed of the order determining ID and the order determining password.

In the shop, the scanner 3 is used, to scan the deposited film 9. Digital image data is obtained (step 54). The obtained digital image data is fed to the database 7 in the server 6 through the LAN 2, and is registered (stored) in correlation with the created image stock holder 43 (step 56). The scanning of all images (frames) included in the film 9 and the registration of the obtained digital image data into the database 7 are repeated (NO at step 57, and step 54).

When simultaneous prints are made, the digital image data obtained by the scanner 3 is also fed to the printer 4, and is printed therein. Obtained prints are outputted (step 55).

When the registration of the digital image data into the database 7 is terminated (YES at step 57), the database 7 is closed, thereby terminating the image registration processing (step 58).

When the digital image data is not registered in the database 7 (when extra prints are not particularly ordered using the information communication terminal) (NO at step 51), the digital image data obtained by the scanner 3 is fed to only the printer 4 (steps 59 and 60). When the printing of all the frames is terminated, the processing is terminated (YES at step 61).

② Viewing/Ordering Processing

Figure 8:
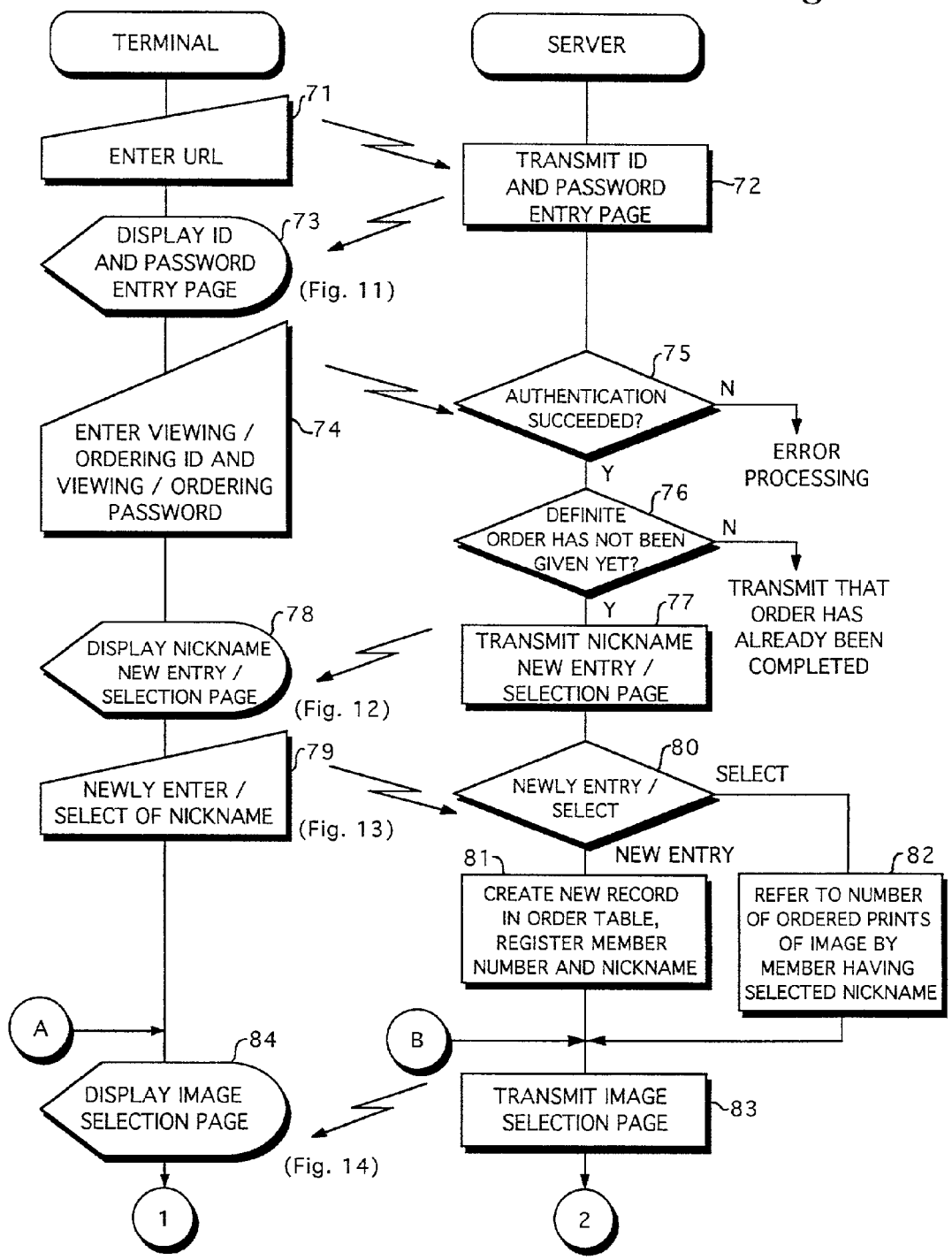
FIGS. 8 to 10 are flow charts showing the flow of processing of a server and a terminal in viewing/ordering processing.
Figure 9:
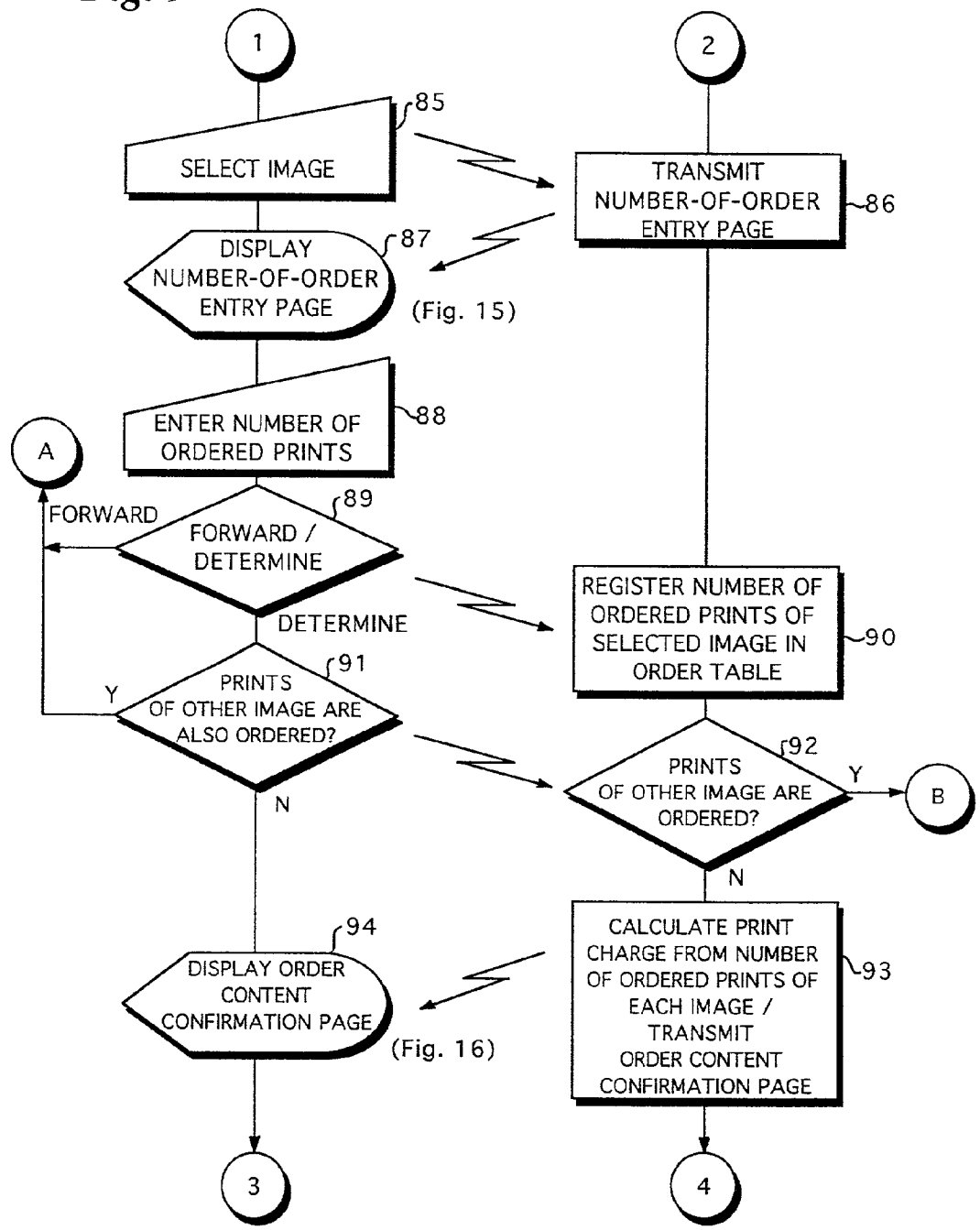
Figure 10:
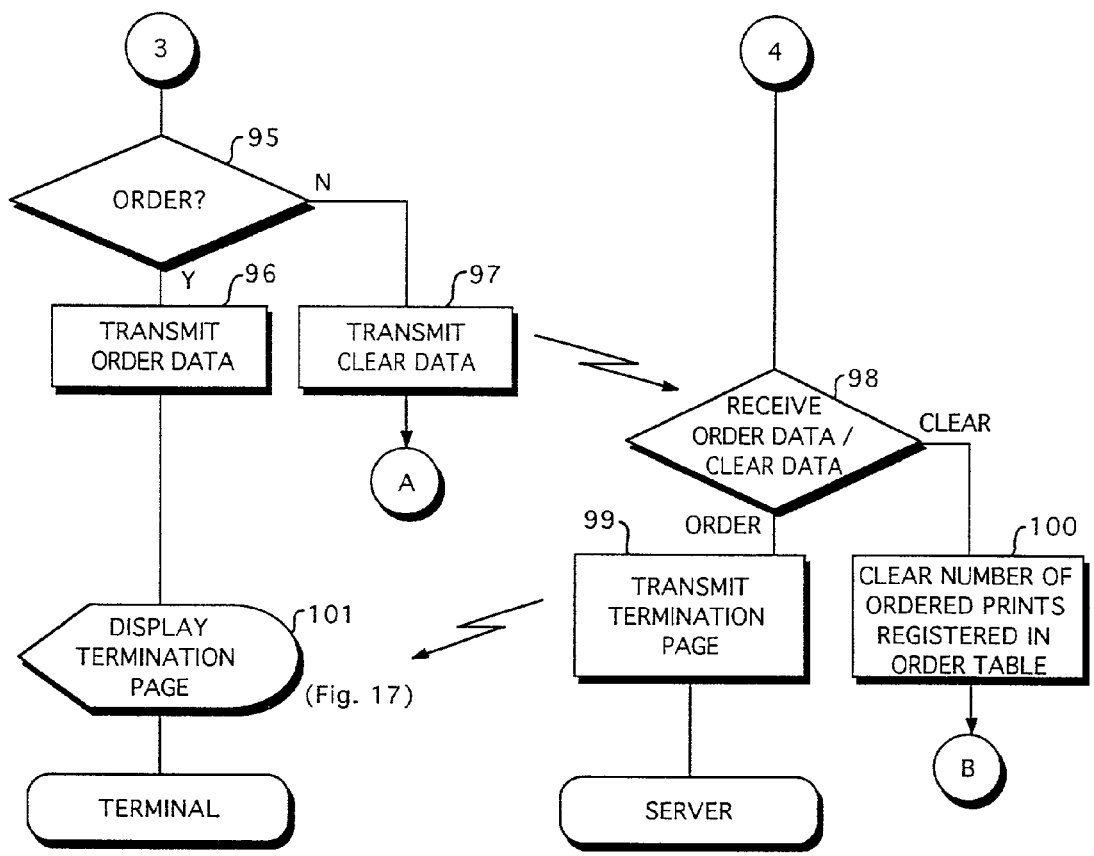

FIGS. 8, 9, and 10 are flow charts showing processing of the server 6 and the information communication terminal in viewing/ordering processing which is one processing of the print ordering system, along with the flow of data. The viewing/ordering processing is for the members belonging to the group viewing the images recorded on the film taken into the shop by the representative using the information communication terminal and ordering the prints of the images. A case where the used information communication terminal is the portable telephone set 20A (see FIGS. 5 and 6) is taken as an example. FIGS. 11 to 17 illustrate examples of a page (a window) displayed on the display screen 27 of the portable telephone set 20A.

When the net connection button 21 in the portable telephone set 20A is pressed, the portable telephone set 20A enters a mode for connection to the network 15. The member enters the URL of the shop previously reported from the representative into the portable telephone set 20A using the ten-key pad 25 or the like, and then presses the determination button 28 (step 71). A connection message is transmitted to the sever 6 from the portable telephone set 20A. The server 6 which received the message transmits data representing an ID and password entry page (HTML (HyperText Markup Language) data, etc.) toward the portable telephone set 20A (step 72). An ID and password entry page W1 (FIG. 11) is displayed on the display screen 27 of the portable telephone set 20A (step 73).

The ID and password entry page W1 includes an area W1a into which an ID is to be entered, an area W1b into which a password is to be entered, and an "OK" button.

When an up key or a down key in the up-down-right-left key 26 in the portable telephone set 20A is pressed, an area into which characters can be entered (clicked) is moved. The member takes the ID entry area W1a as the area into which characters can be entered (the area into which characters can be entered is overlapped with the ID entry area W1a) using the up-down-right-left key 26. The viewing/ordering ID previously reported from the representative is entered into the ID entry area W1a using the ten-key pad 25 or the like. In the same manner, the viewing/ordering password is entered into the password entry area W1b using the ten-key pad 25 or the like. Thereafter, the "OK" button is taken as the area into which characters can be entered (the area where characters can be entered is overlapped with a character representation "OK" using the up-down-right-left key 26). When the determination button 28 in the portable telephone set 20A is pressed, the viewing/ordering ID and the viewing/ordering password which have been entered are transmitted toward the server 6 (step 74).

In the server 6 which has received the viewing/ordering ID and the viewing/ordering password, authentication processing is performed. That is, when both of the viewing/ordering ID and the viewing/ordering password which have been received are the same as ones stored in one record in the group data table 41, the program proceeds the subsequent processing (YES at step 75). When errors occur in both or either one of the viewing/ordering ID and the viewing/ordering password (they do not coincide with the ones stored in one record in the group data table 41), predetermined error processing (for example, processing for indicating that authentication failed on the display screen 27 of the portable telephone set 20A), thereby terminating the viewing/ordering processing (NO at step 75).

When authentication succeeded (both the viewing/ordering ID and the viewing/ordering password coincide with the ones stored in the one record in the group data table 41), a group (a group ID) including the member who accesses the server 6 using the portable telephone set 20A is specified with the viewing/ordering ID used as a key. The group ID can be specified from the viewing/ordering ID by including the group ID (000601-3) in a part of the viewing/ordering ID (B-000601-3), for example, as shown in FIG. 3.

An order status related to the specified group ID is referred to in the order table 42 (see FIG. 4) (step 76). When a group order (a definite order given by the representative of the group, described later) has not been given yet (the order status is "Yet"), the program proceeds to the subsequent processing (YES at step 76). When the group order has already been given by the representative of the group (the order status is "Already"), it is indicated on the display screen 27 of the portable telephone set 20A that the order has already been completed, thereby terminating the viewing/ordering processing (NO at step 76).

Figure 12:
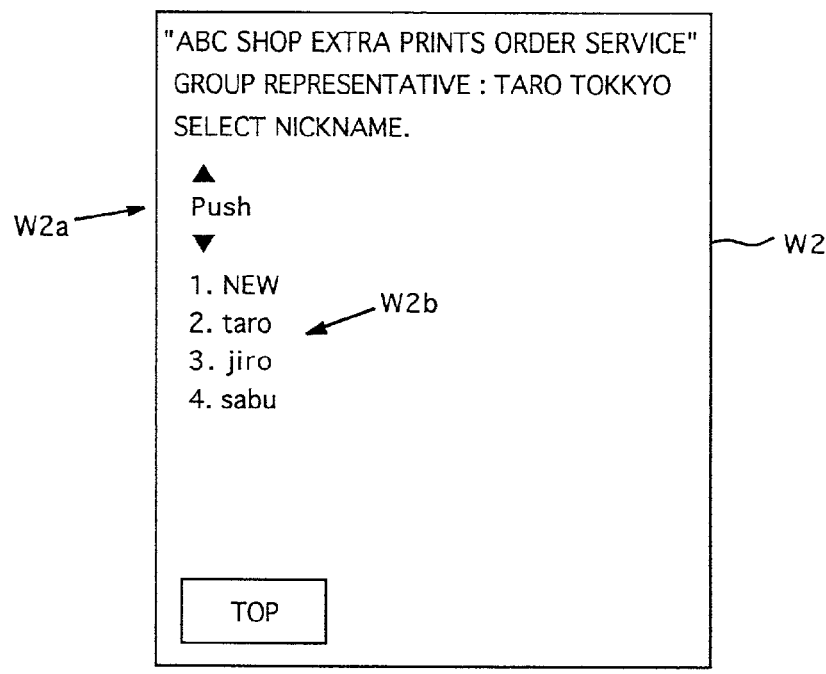
FIG. 12 illustrates a nickname new entry/selection page.
Figure 13:
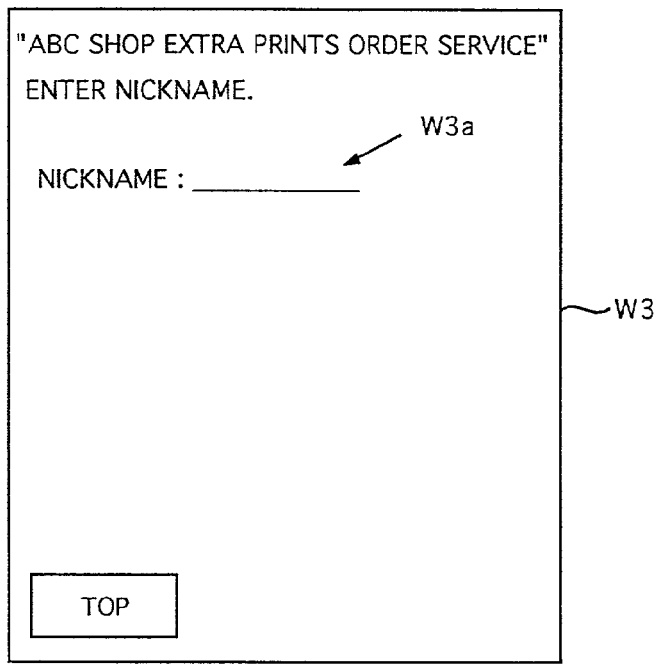
FIG. 13 illustrates a nickname entry page.

When the group order has not been given yet (YES at step 76, and the order status is "Yet"), a nickname new entry/selection page W2 is transmitted to the portable telephone set 20A from the server 6 (step 77), and is displayed on the display screen 27 (step 78; FIG. 12).

On the nickname new entry/selection page W2, "1. New" for newly registering a nickname and nicknames ("2. taro", "3. jiro", and "4. sabu"), which have already been registered, of the members are displayed (a member display area W2b). There is a character representation "Top" (means "to top") in a lower part of the page. A selection instruction area W2a comprising an upper arrow, a lower arrow, and a character representation "Push" therebetween is displayed above the member display area W2b. A selection instruction area W2a can be used when the area where characters can be entered is moved upward or downward.

When "Top" is selected using the up key or the down key in the up-down-right-left key 26 or the selection instruction area W2a (the selecting operation is the same as those on the other pages), and the determination button 28 is pressed, the ID and password entry page W1 is displayed again on the display screen 27 in place of the nickname new entry/selection page W2 (which is the same on the other pages).

When a new nickname is registered, "1. New" is selected, and the determination button 28 is pressed. A nickname entry page W3 is displayed on the display screen 27 (FIG. 13) in place of the nickname new entry/selection page W2. The nickname entry page W3 includes an area W3a into which a nickname is entered and a character representation "Top".

When the nickname is entered into the nickname entry area W3a (step 79), and the determination button 28 is pressed, that is transmitted to the server 6 and a new record (a rear half part) is created in the order table 42 (FIG. 4) in the database 7 in the server 6. The created new record stores a member number newly adopted and the entered nickname (Newly enter at step 80, and step 81).

An image stock holder 43 is specified with the group ID used in authentication processing (step 75) as a key (the pass to the image stock holder 43 includes the group ID) Digital image data is read out of the specified image stock holder 43. An image selection page W4 including the read digital image data is created, and is transmitted from the server 6 toward the portable telephone set 20A (step 83 and step 84).

Figure 14:
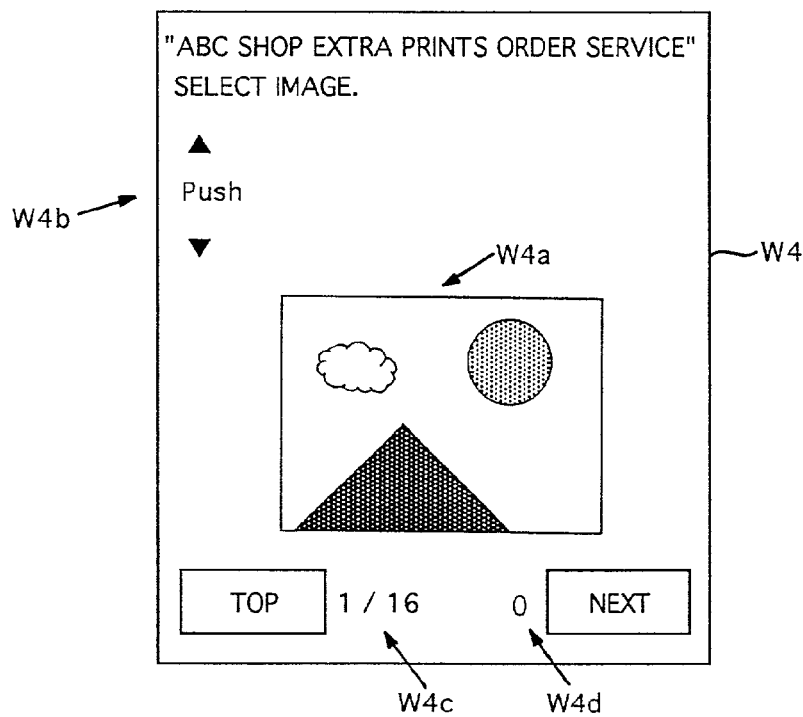
FIG. 14 illustrates an image selection page.

FIG. 14 illustrates an example of the image selection page W4. The image selection page W4 includes an image display area W4a, a selection instruction area W4b, an image number/total-of-images display area W4c, a number-of-ordered prints display area W4d, and character representations "Top" and "Next".

On the image display area W4a, images represented by the digital image data belonging to the image stock holder 43 specified by the group ID are displayed one of frames corresponding to the images at a time. On the image number/total-of-images display area W4c, the image number and the total number of the images represented by the image data belonging to the image stock holder 43 (1/16 in FIG. 14; which indicates that the digital image data corresponding to 16 frames is stored in the image stock holder 43 specified by the group ID, and the displayed image corresponds to the first frame). The number of ordered prints of the image displayed on the image display area W4a is displayed on the number-of-ordered prints display area W4d.

When the up key or the down key in the up-down-right-left key 26 is pressed (or an upward arrow or a downward arrow in the selection instruction area W4b is selected), the image displayed on the image display area W4a is switched to the image represented by the other digital image data belonging to the image stock holder 43. The image number in the image number/total-of-images display area W4c is switched to an image number corresponding to the image displayed on the image display area W4a (2/16, 3/16 . . . 16/16).

Figure 15:
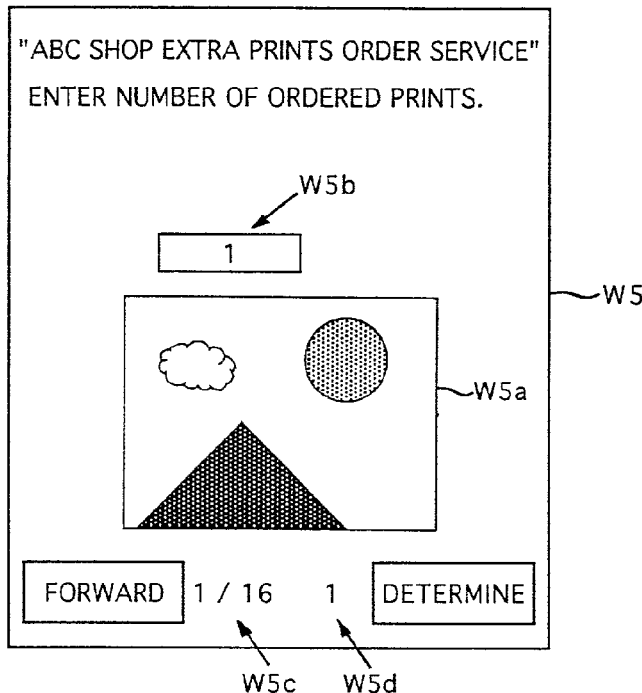
FIG. 15 illustrates a number-of-ordered prints entry page.

When the determination button 28 is pressed in a state where the image whose prints are desired to be made is displayed on the image display area W4a (step 85), a page into which the number of ordered prints is to be entered (a number-of-ordered prints entry page W5; FIG. 15) is displayed on the display screen 27 in place of the image selection page W4 (steps 86 and 87). The number-of-ordered prints entry page W5 also includes an image display area W5a, an image number/total-of-images display area W5c, and a number-of-ordered prints display area W5d. The number-of-ordered prints entry page W5 further includes a number-of-ordered prints entry area W5b and character representations "Forward" and "Determine".

The member enters the number of ordered prints of the image displayed on the image display area W5a into the number-of-ordered prints entry area W5b using the ten-key pad 25 or the like (step 88).

When "Forward" in a lower part of the number-of-ordered prints entry page W5 is selected, and the determination button 28 is pressed, the image selection page W4 (FIG. 14) is displayed again on the display screen 27 (Forward at step 89, and step 84). When "Determine" is selected, and the determination button 28 is pressed, data representing an order corresponding to the number of ordered prints of the image displayed on the display screen 27 (the selected image) is transmitted toward the server 6 (Determine at step 89). A number representing the number of ordered prints (a code representing the number) is stored at a position of the image number, corresponding to the selected image, in "Ordered image number/number of ordered prints" in the order table 42 (step 90). The image selection page W4 is displayed again on the display screen 27. When prints of the other image are also ordered, the member repeats the above-mentioned operations (YES at step 92, step 83, YES at step 91, and step 84).

Figure 16:
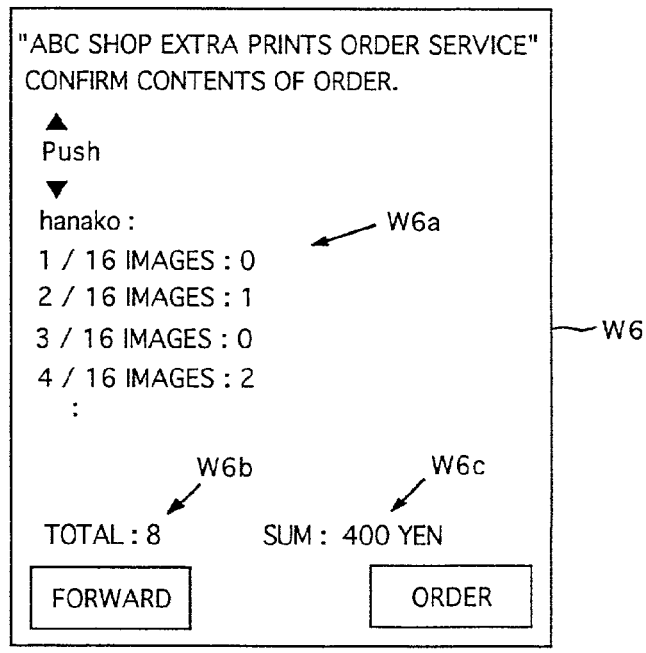
FIG. 16 illustrates an order content confirmation page.

When the print order is terminated, a character representation "Next" included in the image selection page W4 (FIG. 14) is selected, and the determination button 28 is pressed (NO at step 91, and NO at step 92). In the server 6, "Ordered image number/number-of-ordered prints" in the order table 42 is referred to, to calculate a print charge (a sum of money), and an order content confirmation page W6 is created and is transmitted to the portable telephone set 20A. As shown in FIG. 16, the order content confirmation page W6 includes an order content display area W6a (the ordered image number and the number of ordered prints of the image are displayed), a total-of-ordered prints display area W6b, and a calculated print charge display area W6c.

The order confirmation page W6 includes character representations "Forward" and "Order". When "Order" is selected, and the determination button 28 is pressed, order data is transmitted to the server 6 from the portable telephone set 20A (YES at step 95, and step 96). A termination page W7 is transmitted to the portable telephone set 20A from the server 6 (Order at step 98, and step 99), and is displayed on the display screen 27 (step 101; FIG. 17), thereby terminating the reading/ordering processing.

When "Forward" is selected in the order confirmation page W6, and the determination button 28 is pressed, clear data is transmitted to the server 6 from the portable telephone set 20A (step 97). The server 6 which has received the clear data clears data representing the numbers of ordered prints of the images, which are stored in the order table 42 with respect to the member (set all the data to zero) (Clear at step 98, and step 100). The image selection page W4 (FIG. 14) is displayed again on the display screen 27 (steps 83 and 84).

The members can change the contents of the order until the group order (definite order), described later, is given by the representative of the group. The member who has performed the second or subsequent viewing/ordering selects corresponding one of the nicknames displayed on the member display area W2b in the nickname new entry/selection page W2 (FIG. 12), and presses the determination button 28 (FIG. 8; step 79). The server 6 refers to the column "Ordered image number/number of ordered prints" in the order table 42 with the selected nickname as a key (Select at step 80, and step 82). In this case, the number of ordered prints which has already been stored in the column "Ordered image number/number of ordered prints" in the order table 42 is displayed in the number-of-ordered prints display areas W4d and W5d in respective lower parts of the image selection page W4 and the number-of-ordered prints entry page W5 which are displayed on the display screen 27.

③ Order Determination Processing (and Reorder Processing)

Figure 18:
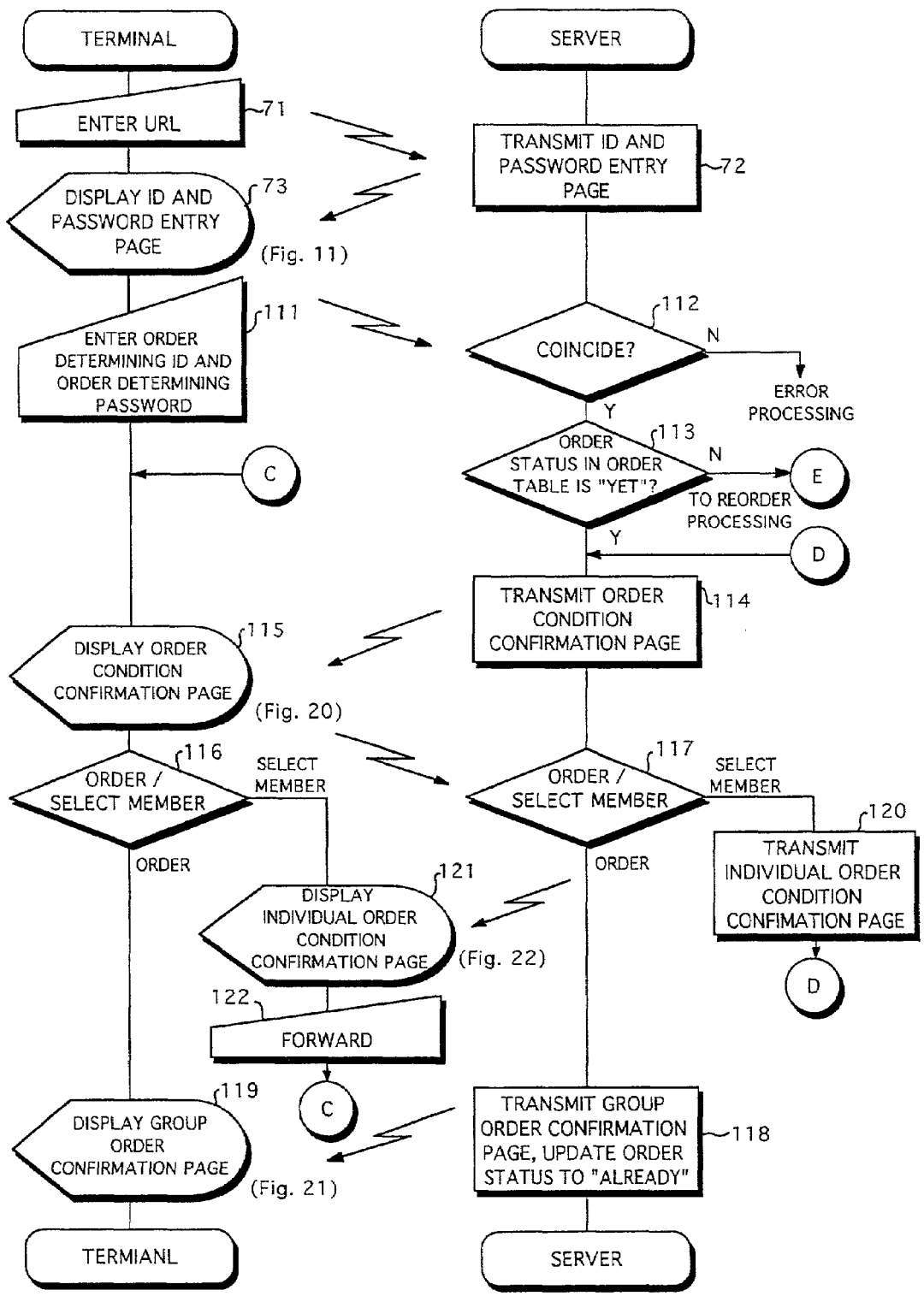
FIG. 18 is a flow chart showing the flow of processing of a server and a terminal in order determination processing.
Figure 19:
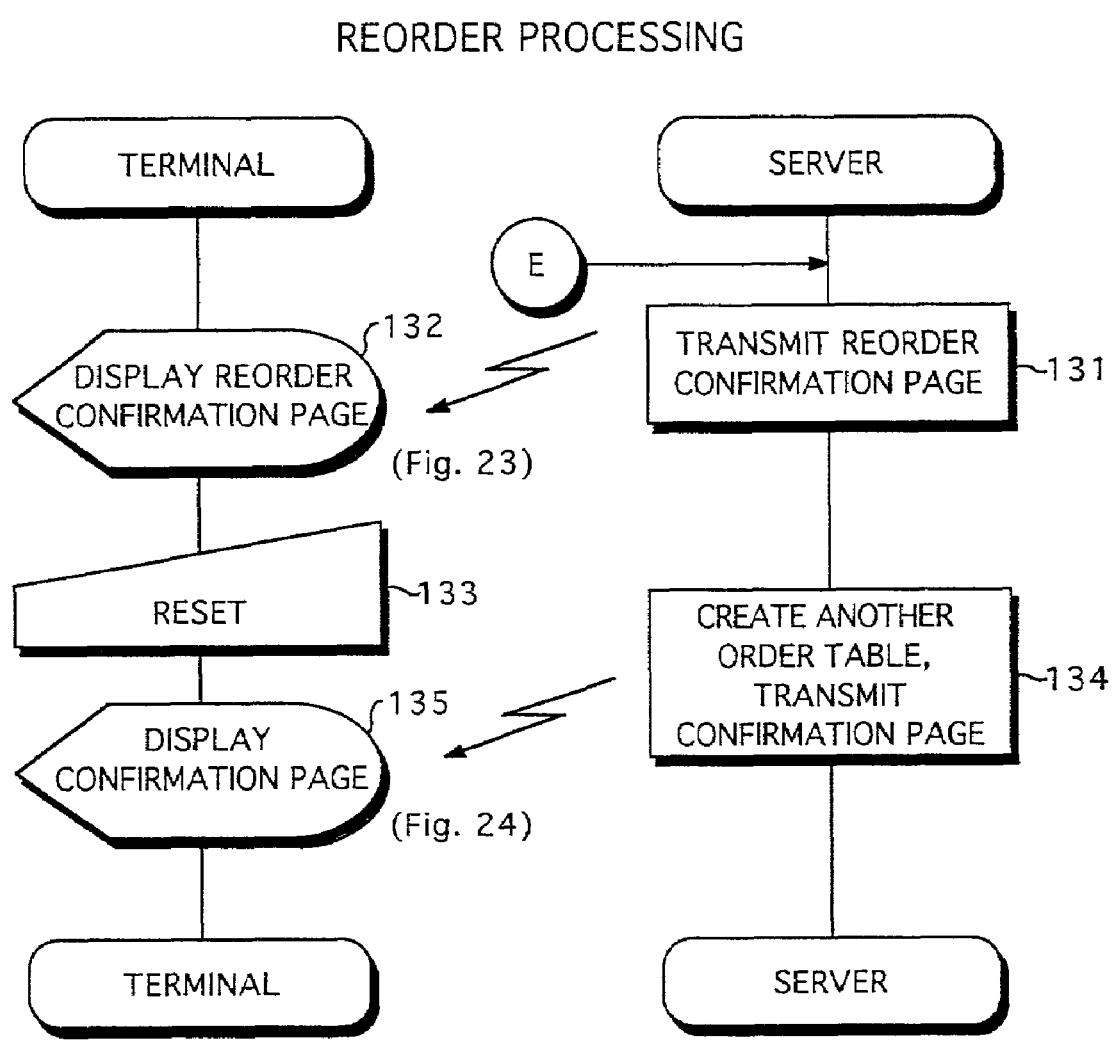
FIG. 19 is a flow chart showing the flow of processing of a server and a terminal in reordering processing.

FIG. 18 is a flow chart showing processing of the server 6 and the information communication terminal in order determination (group order) processing which is one processing of the print ordering system, along with the flow of data. FIG. 19 is a flow chart showing processing of the server 6 and the information communication terminal in reordering processing performed in the order determination processing, along with the flow of data. The order determination processing is for the representative of the group definitely deciding (determining) the order by each of the members belonging to the group after the member terminates the above-mentioned ordering processing. The flow chart shown in FIG. 18 includes the same processing as that in the flow chart shown in FIG. 8, and the same processing steps are respectively assigned the same reference numerals and hence, the overlapped detailed description is not repeated. FIGS. 20 to 24 illustrate examples of a page displayed on the display screen 27 of the portable telephone set 20A.

Figure 11:
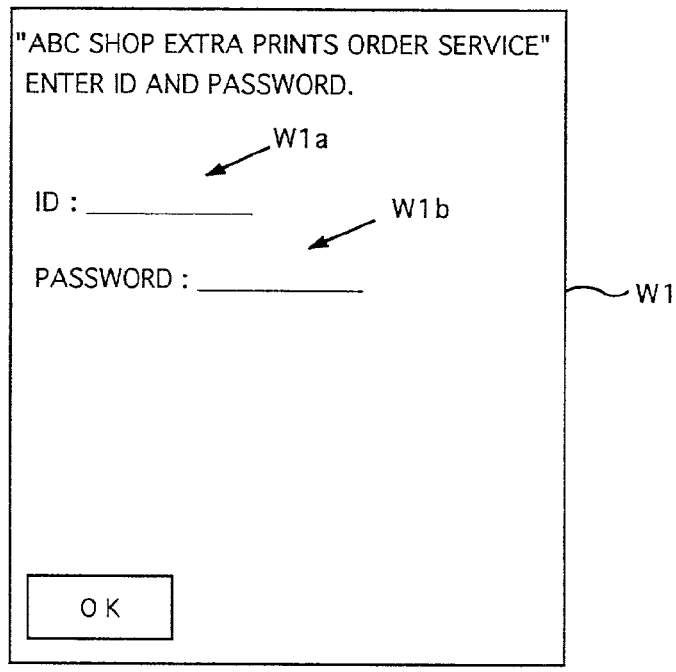
FIG. 11 illustrates an ID and password entry page.

When the representative of the group enters into the portable telephone set 20A the URL of the shop in which he or she deposits the film 9, the ID and password entry page W1 is displayed on the display screen 27 (steps 71 to 73; FIG. 11).

In the order determination processing, the order determining ID and the order determining password are respectively entered into the ID entry area W1a and the password entry area W1b in the ID and password entry page W1. The representative of the group is previously informed of the order determining ID and the order determining password.

When a character representation "OK" in the ID and password entry page W1 is selected, and the determination button 28 is pressed, the order determining ID and the order determining password which have been entered are transmitted to the server 6 from the portable telephone set 20A (step 111). In the server 6, authentication processing is performed (step 112). When both of the order determining ID and the order determining password which have been received coincide with ones stored in one record in the group data table 41, the program proceeds to the subsequent processing (YES at step 112). When errors occur in both or either one of the order determining ID and the order determining password (they do not coincide with the stored ones), predetermined error processing is performed, thereby terminating the order determination processing (NO at step 112).

When authentication succeeded (YES at step 112), the order status in the order table 42 is referred to in the server 6 (step 113).

When the order status is "Yet" (YES at step 113) (a case where the order has not been determined yet by the representative of the group), the server 6 refers to the order table 42, to create an order condition confirmation page W8 and transmit the created order condition confirmation page W8 toward the portable telephone set 20A (steps 114 and 115). FIG. 20 illustrates an example of the order condition confirmation page W8. The order condition confirmation page W8 includes a selection instruction area W8a, a number-of-ordered prints display area W8b, a total-of-ordered prints display area W8c, and a group order total charge display area W8d.

There are character representations "Top" and "Order" in a lower part of the order condition confirmation page W8. When "Order" is selected, and the determination button 28 is pressed (step 116, and Order at step 117), the order table 42 is referred to in the server 6, so that a group order (order determination) confirmation page W9 is created and is transmitted toward the portable telephone set 20A (step 118). A group order confirmation page W9 is displayed on the display screen 27 of the portable telephone set 20A (step 119; FIG. 21). In the server 6, the order status in the order table 42 is updated from "Yet" to "Already".

In the group order confirmation page W9 (FIG. 21), a date & time (year, month, day and time) on which a group order is accepted, an order determining ID, the total number of ordered prints in a group, a total sum, a planned completion date & time (year, month, day and time), and an erasure date (year, month, day and time) on which digital image data registered in the database 7 is erased. The planned completion date & time is a date and time obtained by adding a predetermined number of days (or time) to a date and time on which the group order is given (a date and time on which order determination is accepted), for example. The group order date and time and the planned completion date & time are registered in the order table 42. The order determination processing is terminated by the display of the group order confirmation page W9.

Figure 25:
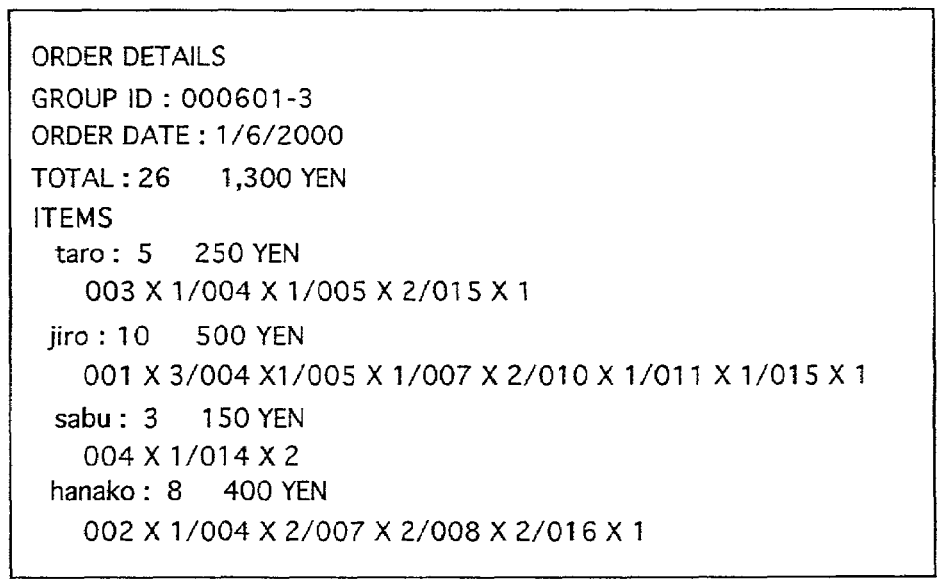
FIG. 25 illustrates an example of order details.
Figure 26:
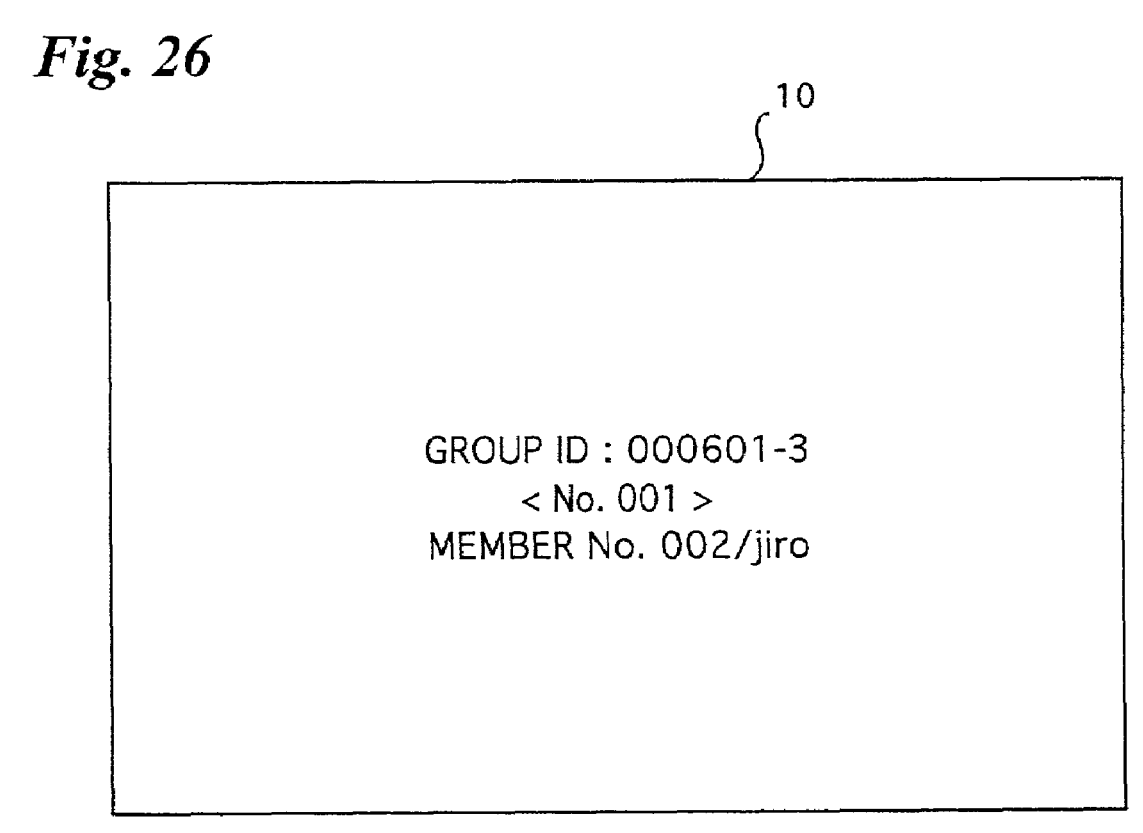

FIGS. 25 and 26 respectively illustrate an example of order details issued by the server 6 and an example of information printed on the reverse surface of the print 10 handed to each of the members belonging to the group. The order details, together with photographs, may be handed to the representative of the group in the shop or may be previously handed to the representative of the group by an E-mail or the like. A group ID, an image number, a member number, and a nickname are printed on the reverse surface of the print 10.

Figure 22:
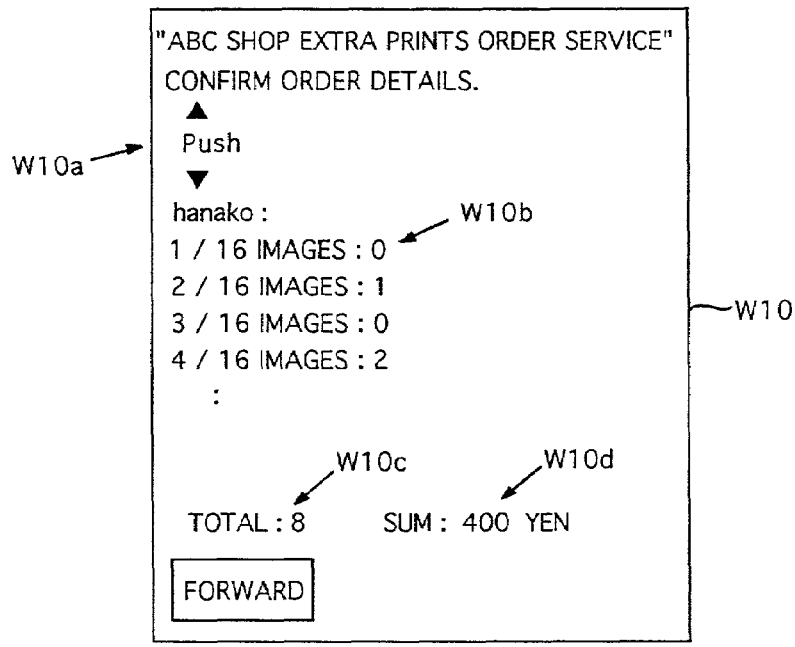
FIG. 22 illustrates an individual order condition confirmation page.

In the member display area W8b in the order condition confirmation page W8 (FIG. 20), when the character representation of any one of the members is selected, and the determination button 28 is pressed (Select member at step 116), order details (an individual order condition confirmation page W10) including the number of ordered prints for each frame are transmitted to the portable telephone set 20A from the server 6, and are displayed on the display screen 27 (Select member at step 117, step 120, and step 121; FIG. 22). The individual order condition confirmation page W10 includes a selection instruction area W10a, a by-image number-of-ordered prints display area W10b, a total-of-ordered prints display area W10c, and an order sum display area W10d. The order condition confirmation page W10 also includes a character representation "Forward". When "Forward" is selected, and the determination button 28 is pressed (step 122), the order condition confirmation page W8 (FIG. 20) is displayed again on the display screen 27 (step 115).

In a state where the order determination processing has already been completed (the order status in the order table 42 is "Already"), when the order determining ID and the order determining password are received by the server 6 (YES at step 112, and NO at step 113), a reorder confirmation page W11 (FIG. 23) is transmitted to the portable telephone set 20A from the server 6 (FIG. 19; step 131), and is displayed on the display screen 27 (step 132) (the order determination processing in a case where the order status is "Already" is particularly referred to as reordering processing).

Figure 23:
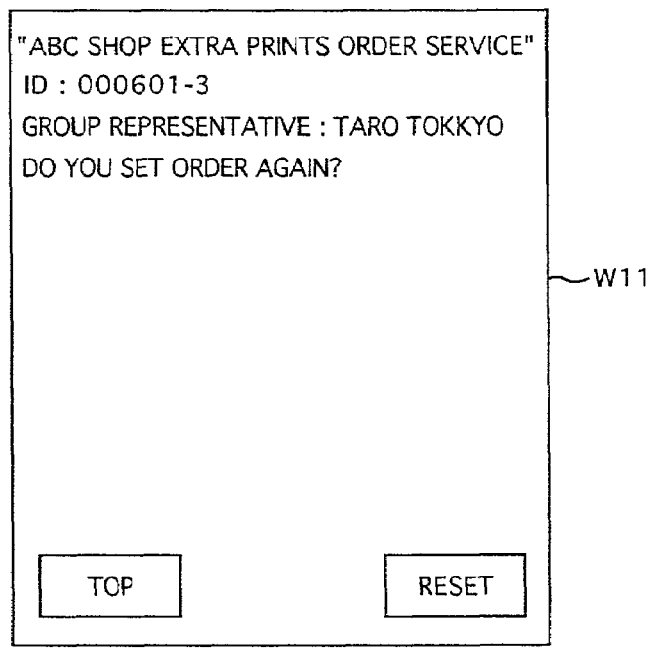
FIG. 23 illustrates a reorder confirmation page.
Figure 24:
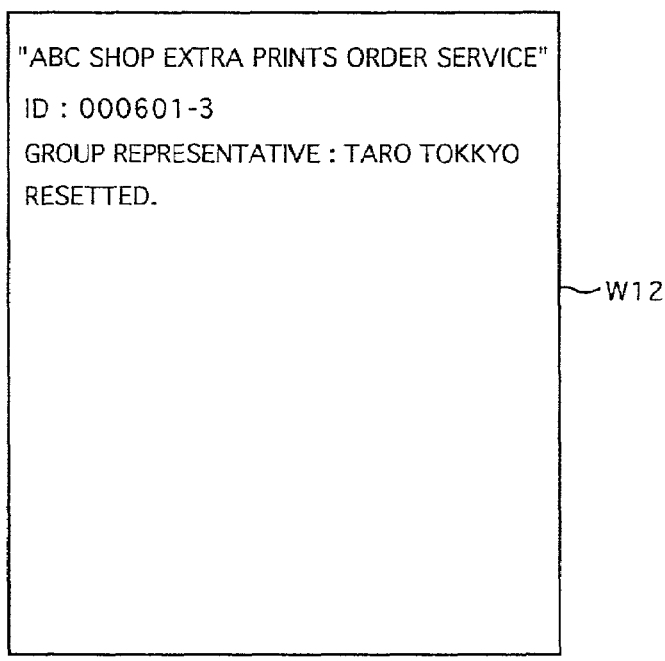
FIG. 24 illustrates a confirmation page.

As shown in FIG. 23, there are character representations "Top" and "Reset" in a lower part of the reorder confirmation page W11. When "Reset" is selected, and the determination button 28 is pressed (step 133), another order table (the second order table) is created with respect to the group in the server 6, and is stored in the database 7. A confirmation page W12 (FIG. 24) is transmitted to the portable telephone set 20A from the server 6, and is displayed on the display screen 27 (steps 134 and 135). The order table 42 newly created stores the same data as the order table (the first order table) so far used with respect to a group ID, a member number, a nickname, and the type of order, while being blank with respect to an order date & time, a planned completion date & time, and an ordered image number/number of ordered prints. "Yet" is stored in the order status. Even if the order determination processing is performed once by the representative of the group, the other members belonging to the group can give orders again. An order table 42 newly created is stored in the database 7 so as to belong to the order table holder 44.

Although in the above-mentioned embodiment, the group ID, the viewing/ordering ID, and the viewing/ordering password, the order determining ID, and the order determining password are issued using as a unit a group comprising a plurality of members, one record is creased in the group data table 41, and the order table 42 is created, the unit may, of course, use another element as a basis. One film or one digital media (a memory card, a CD, etc.) can be also used as a unit, or film strips can be used as a unit when a developed film is taken into the shop.

Although in the above-mentioned embodiment, different IDs are respectively used as the viewing/ordering ID and the order determining ID, only the viewing/ordering password and the order determining password may differ, and the viewing/ordering ID and the order determining ID may be the same. The server 6 can judge which of viewing/ordering processing and order determination processing should be performed on the basis of the password.

A case where the portable telephone set 20A is used as an information communication terminal and a case where another terminal, for example, the personal computer 20C is used as an information communication terminal, the number of frames composing the image data to be transmitted toward the information communication terminal may be changed. For example, one frame of image data is transmitted at one time in a case of a terminal having a small display screen, for example, the portable telephone set 20A, while being transmitted a plurality of frames (e.g., six frames) at one time in a case of a terminal having a relatively large display screen, for example, the personal computer. Of course, a thumbnail image may be produced in the server 6, and transmitted to the information communication terminal. A plurality of images can be looked over at a time.

In a case where an information communication terminal capable of making color display and a case where an information communication terminal capable of making only black-and-white display, image data respectively transmitted to the information communication terminals may be made different. For example, image data which can be displayed in color is stored in the image stock holder 43. When the information communication terminal can only make black-and-white display, image data which can be displayed in color is converted into image data for black-and-white display, and the image data is transmitted toward the information communication terminal. Since the amount of image data transmitted to the information communication terminal from the server 6 can be made small, the speed of the transmission of the image data can be increased.

As to which size is the size of the display screen (display capability) of the information communication terminal and whether or not color display is possible, for example, data representing the type of used equipment and the type of the display device may be previously transmitted to the server 6 from the information communication terminal.

Although the present invention has been described and illustrated in detail, it is clearly understood that the same is by way of illustration and example only and is not to be considered by way of limitation, the spirit and scope of the present invention being limited only by the terms of the appended claims.

What is claimed is:

1. A server computer capable of being connected to a communication terminal comprising a display device capable of displaying an image such that they can communicate with each other through a network, comprising:
   an image database storing image data;
   an image data transmission device for transmitting to said communication terminal the image data stored in said image database in response to an image transmission request from said communication terminal;
   a storage device storing group order information transmitted from said communication terminal and related to prints of an image represented by the image data transmitted by said image data transmission device;
   a controller controlling a printer so as to print the image represented by the image data specified on the basis of the group order information stored in said storage device in response to the print command from said communication terminal;
   image data registration acceptance means for accepting the registration of the image data to be stored in the image database;
   first ID generation means for generating an image ordering ID and a print commanding ID in correlation with the accepted image data in response to the acceptance of the image data by the image data registration acceptance means,
   the image transmission request transmitted from the communication terminal including said image ordering ID, said image data transmission device transmitting to said communication terminal the image data correlated with the image ordering ID in response to the image transmission request from the communication terminal,
   second ID generation means for generating a member specifying ID in correlation with the image ordering ID generated by the first ID generation means, the member specifying ID specifying a particular member of a group,
   the communication terminal accepting input from members of the group including the member specifying ID, the image ordering ID, and the member's selections which comprise the group order information,
   said print controller waiting for the print commanding ID and upon receipt thereof, controlling the printer to print a group order represented by the group order information.

2. The server computer according to claim 1, wherein said group order information includes, for each member of the group, information related to the desired number of prints of the image represented by the image data specified by said group order information.

3. The server computer according to claim 2, further comprising:
   means for calculating a print charge on the basis of the information related to said desired number of prints; and
   print charge transmission means for transmitting to said communication terminal data representing the calculated print charge.

4. The server computer according to claim 1, further comprising:
   means for calculating at least a planned completion date for the prints of the image by the printer controlled by said printer controller in response to the print command from said communication terminal, and
   planned completion date transmission means for transmitting to said communication terminal data representing the calculated planned completion date.

5. The server computer according to claim 1, further comprising:
   group order condition information transmission means for transmitting to said communication terminal order condition information represented on the basis of the group order information stored in said storage device in response to a group order condition confirmation request from the communication terminal.

6. The server computer according to claim 1, further comprising:
   means for accepting from said communication terminal the transmission of display device type information related to the type of the display device in the communication terminal,
   said image data transmission device converting the image data stored in said image database into image data adaptable to the display device in the communication terminal in accordance with the display device type information and transmitting the image data to the communication terminal.

7. The server computer according to claim 1, further comprising:
- password generation means for respectively generating an image ordering password corresponding to the image ordering ID and a print commanding password corresponding to the print commanding ID which are generated by the first ID generation means;
- image data transmission judgment means for judging whether or not the image data should be transmitted to said communication terminal on the basis of the image ordering ID and the image ordering password; and
- print judgment means for judging whether or not the printer should be controlled so as to print the image represented by the image data on the basis of the print commanding ID and the print commanding password,
- the image transmission request transmitted from the communication terminal further including the image ordering password, and the image data transmission device transmitting the image data to the communication terminal when it is judged that the image data can be transmitted by the image data transmission judgment means on the basis of the image ordering ID and the image ordering password,
- the print command transmitted from the communication terminal further including the print commanding password, and the printer controller controlling the printer so as to print the image represented by the image data in a case where it is judged that printing is possible by the print judgment means on the basis of the print commanding ID and the print commanding password.

8. The server computer according to claim 1,
- said member specifying ID, together with the group order information, being transmitted from the communication terminal, and the storage device storing the received group order information and the member specifying ID with both correlated with each other.

9. The server computer according to claim 1, further comprising:
- means for erasing from the image database the image data stored in the image database when a predetermined set time period has elapsed from a date for acceptance of the image data by the image data registration acceptance means.

10. The server computer according to claim 9, further comprising:
- erasure confirmation transmission means for transmitting data representing a planned erasure date to the communication terminal prior to erasing the image data by the erasure means.

11. The server computer according to claim 9, wherein
- said erasure means extends said set time period for the image data specified on the basis of the order information in response to the print command from the communication terminal.

12. A method of controlling a server computer capable of being connected to a communication terminal having a display device capable of displaying an image such that they can communicate with each other through a network, comprising the steps of:
- storing image data in an image database;
- transmitting to said communication terminal the image data stored in said image database in response to an image transmission request from said communication terminal;
- storing group order information related to prints of an image represented by the image data transmitted from said communication terminal;
- controlling a printer so as to print the image represented by the image data specified on the basis of the group order information stored in said storage device in response to a print command from said communication terminal;
- accepting the registration of the image data to be stored in the image database; and
- generating an image ordering ID and a print commanding ID in correlation with the accepted image data in response to the acceptance of the image data,
- the image transmission request transmitted from the communication terminal including said image ordering ID, said transmitting step transmitting to said communication terminal the image data correlated with the image ordering ID in response to the image transmission request from the communication terminal,
- generating a member specifying ID in correlation with said image ordering ID, the member specifying ID specifying a particular member of a group, and
- accepting input from members of the group including the member specifying ID, the image ordering ID, and the member's selections which comprise the group order information,
- said print controlling step waiting for the print commanding ID and upon receipt thereof, controlling the printer to print a group order represented by the group order information.

* * * * *